(12) United States Patent
Dent et al.

(10) Patent No.: US 7,113,593 B2
(45) Date of Patent: Sep. 26, 2006

(54) RECURSIVE CRYPTOACCELERATOR AND RECURSIVE VHDL DESIGN OF LOGIC CIRCUITS

(75) Inventors: Paul W. Dent, Pittsboro, NC (US); Ben Smeets, Dalby (SE); William J. Croughwell, III, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 948 days.

(21) Appl. No.: 09/800,145

(22) Filed: Mar. 6, 2001

(65) Prior Publication Data

US 2003/0016822 A1    Jan. 23, 2003

(51) Int. Cl.
*H04K 1/00* (2006.01)
(52) U.S. Cl. .......................... 380/28; 380/30; 713/174; 708/503; 708/504
(58) Field of Classification Search ................. 380/30, 380/264, 29, 28; 708/7, 491, 200, 503–504, 708/650; 713/174
See application file for complete search history.

(56) References Cited

U.S. PATENT DOCUMENTS

| 4,313,174 A | * | 1/1982 | White ....................... 708/606 |
| 5,828,590 A | | 10/1998 | Chen et al. |
| 6,035,317 A | | 3/2000 | Guy |

OTHER PUBLICATIONS

Wey et al., Design and Analysis of VLSI-based parallel Multipliers, Jul. 1990, IEEE, vol. 137 pp. 328-329.*
Heikes, A 4.5 mm Multiplier Array for 200MFLOP Pipelined Coprocessor, 1994, IEEE, p. 290.*
Bosselaers, Antoon; Govaerts, Rene; Vandewalle, Joos; "Comparison of three modular reduction functions," Crypto '93, pp. 175-186.
Wang, Charles C.; Troung, T.K.; Shao, Howard M.; Deutsch, Leslie J.; Omura, Jim K.; Reed, irving S.; "VLSI Architectures for Computing Multiplications and Inverses in $GF(2^m)$," IEEE Transactions on Computers, vol. C-34, No. 8., Aug. 1985,, pp. 709-717.
Maeder, R E., "Storage allocation for the Karatsuba integar multiplication algorithm," *Design and Implementation of Symbolic Computation Systems International Symposium. Disco '93 Proceedings Springer-Verlag Berlin, Germany*, 1993, pp. 59-65, XP009062450, ISBN: 3-540-57235-X.
Cesari, G., Raeder, R, "Performance analysle of the parallel Karatsuba multiplication algorithm for distributed memory architectures," *Journal of Symbolic Computation*, vol. 21, No. 4-8, Apr. 1996 (Apr. 1996), pp. 467-473, XP002369549.

* cited by examiner

*Primary Examiner*—Hosuk Song
*Assistant Examiner*—Paula Klimach
(74) *Attorney, Agent, or Firm*—Coats & Bennett, P.L.L.C.

(57) ABSTRACT

A method and apparatus for performing cryptographic computations employing recursive algorithms to accelerate multiplication and squaring operations. Products and squares of long integer values are recursively reduced to a combination of products and squares reduced-length integer values in a host processor. The reduced-length integer values are passed to a co-processor. The values may be randomly ordered to prevent disclosure of secret data.

42 Claims, 5 Drawing Sheets

RECURSIVE CRYPTOACCELERATOR AND RECURSIVE VHDL DESIGN OF LOGIC CIRCUITS

BACKGROUND OF THE INVENTION

The present invention relates generally to cryptographic accelerators to accelerate cryptographic computation and, more particularly, to a cryptographic accelerator employing recursive algorithms to accelerate multiplication and squaring operations.

Encryption is the process of disguising intelligible information, called plaintext, to hide its substance from eavesdroppers. Encrypting plaintext produces unintelligible data called cipher text. Decryption is the process of converting ciphered text back to its original plaintext. Using encryption and decryption, two parties can send messages over an insecure channel without revealing the substance of the message to eavesdroppers. A cryptographic algorithm, or cipher, is a mathematical function used in the encryption and decryption of data. A cryptographic algorithm typically works in combination with a key to encrypt and decrypt messages. The key, typically a large random number, controls the encryption of data by the cryptographic algorithm. The same plaintext encrypts to different ciphered text with different keys. In general, it is extremely difficult to recover the plaintext of a message without access to the key, even by an eavesdropper having full knowledge of the cryptographic algorithm.

One commonly used type of cryptographic algorithm is a public key algorithm. Public key cryptographic algorithms are based on the identity:

$$|X^Z|_N = X \qquad \text{Eq. (1)}$$

where N, the modulus, is the product of two secret prime numbers $P_1$ and $P_2$, and Z is equal to $M(P_1-1)(P_2-1)+1$. The exponent Z is factored into the product of a private key $K_{PRIV}$ and a public key $K_{PUB}$. Many key pairs can be found by choosing different values of M. The public key $K_{PUB}$ is published and may be used by another to send messages to the owner of the public key, which can only be deciphered by the recipient using the corresponding private key $K_{PRIV}$.

One popular public key algorithm is the RSA Algorithm. The RSA Algorithm enciphers blocks of bits at a time, which may be viewed as a binary number X. The binary number X must have an arithmetic value less than the encryption modulus N. Encryption is performed by raising X to the power of the public key $K_{PUB}$ and reducing it modulo N to produce encrypted ciphertext. The ciphertext may also be viewed as a binary number Y having an arithmetic value less than N. Decryption is performed by raising the binary number Y to the power of the private key $K_{PRIV}$ and reducing the result modulo N.

Another use of public key algorithms is for signing messages to authenticate the sending party's identity. The sending party may sign a message by encrypting the message with his private key $K_{PRIV}$. The receiving party can then use the sender's public key $K_{PUB}$ to decrypt the message. If the message is decrypted successfully, only the sending party in possession of the private key $K_{PRIV}$ could have sent that message. This process of authenticating the message by encryption using the sender's private key $K_{PRIV}$ is referred to as signing.

It is also known to doubly encrypt messages to provide both secure communications and authentication capability. In this case, each party to the communication possesses a public key used for encrypting messages and a private key for decrypting messages. The message is first signed using the sender's private key $K_{PRIV1}$ and modulus $N_1$ and then encrypted using the recipient's public key $K_{PUB2}$ and modulus $N_2$. The recipient decrypts the message using the recipient's private key $K_{PRIV2}$ and modulus $N_2$ to recover the signed message. The signed message is then decrypted using the sender's public key $K_{PUB1}$ and modulus $N_1$ to obtain the original message. Since the sender is the only person possessing the private key $K_{PRIV1}$ that can generate the signed message, the sender's identity is authenticated to the recipient.

Another prior art algorithm that involves exponential operations is the Diffie-Hellman Algorithm. The Diffie-Hellman Algorithm is a key exchange algorithm that allows two parties to agree on a secret key over an insecure channel without divulging the secret key. According to the Diffie-Hellman Algorithm, the parties agree on two, non-secret prime numbers $P_1$ and $P_2$. $P_1$ is typically a large prime number. The security of the system is based on the difficulty of factoring numbers the same size as $P_1$. $P_2$ may be a one-digit prime number. Each party generates a large random number, denoted x and y, respectively. The parties then calculate derived numbers X and Y. The first party computes X using the equation $X = P_2^x \bmod P_1$. The second party computes Y using the equation $Y = P_1^y \bmod P_1$. The first party transmits X to the second party; the second party transmits Y to the first party. The first party computes the secret key K using the equation $K = Y^X \bmod N$. The second party computes the secret key K using the equation $K = X^Y \bmod N$. An eavesdropper cannot compute K with knowledge only of $P_1$, $P_2$, X and Y. Therefore, the value K, which was computed independently by the two parties using information exchanged over the insecure channel, may be used by the parties as the secret key for secure communications.

All of the above-described algorithms involve exponential operations with very large binary numbers. For example, in the RSA Algorithm, the private key $K_{PRIV}$ typically has a length of approximately 2,048 bits. The message block and encryption modulus N are typically in the same order of wordlength. Thus, encryption or decryption with the private key $K_{PRIV}$ involves exponentiating a 2,048 bit message block with a 2,048 bit exponent and reducing the result modulo another 2,048 bit number. These calculations require significant computational power to perform.

A number of algorithms have been devised to reduce the complexity of cryptographic calculations involving exponentiation or modulo reduction. One algorithm, referred to herein as the Successive Squares Algorithm, is used to raise a first large number to the power of a second large number. A second algorithm, referred to herein as the Modulo Reduction Algorithm, is used to reduce a first large number modulo a second large number.

The Successive Squares Algorithm is used to raise a bitstring X to a large power Y. In decryption, the bitstring X is the encrypted ciphertext, and the power Y is the decryption key. In encryption, the bitstring X is the plaintext message, and the power Y is the encryption key. The successive squares of the bitstring X are computed and used to multiply an accumulated value Z, depending on the value of a corresponding bit in the power Y. The accumulated value Z is initialized to a starting value of 1. The successive squares are denoted herein as $X_1 = X^1, X_2 = X^2, X_3 = X^4, \ldots X_n = X^{n-1}$. In the Successive Squares Algorithm, the least significant bit in the power Y, denoted $B_1$, corresponds to the first power of X, the second bit $B_2$ corresponds to the second power of X, the third bit $B_3$ corresponds to the fourth power of X, and so forth until the last bit $B_L$ is reached. Each successive square, $X_1, X_2 \ldots X_n$, is used to multiply the accumulated value Z, depending on the value of the corresponding bit $B_N$ in the power Y. In particular, the accumulated value Z is multiplied by a successive square when the corresponding bit $B_N$ in the power Y is 1. Successive squares corresponding to "0" bits in the power Y do not multiply the accumulated value Z. The Successive Squares Algorithm reduces the number of values that need to be multiplied from $2^{2048}$ to the order of 2,048 where X and Y are 2,048 bits in length.

After each multiplication or squaring operation, the accumulated value Z has a wordlength in the order of 4,096 bits. In encryption and decryption, this accumulated value Z is reduced by modulo reduction to a value in the order of 2,048 bits in length. In particular, the result of each squaring operation is reduced modulo the encryption modulus N of wordlength 2,048. This requires subtracting a large number of multiples of N until the value of the accumulated total Z is less than N. The number of multiples of N which have to be subtracted is in the order of $2^{2048}$ or $10^{600}$ which eliminates the possibility of successive subtraction.

The Modulo Reduction Algorithm is used to reduce a first large number modulo a second large number. According to the Modulo Reduction Algorithm, the approximate reciprocal of N is computed to 2,048 significant bits, ignoring leading zeros after the binary point. Each time a 4,096 bit accumulated value Z is to be reduced modulo N, the approximate number of times T that N would have to be subtracted from Z is calculated using the equation $T=Z \cdot 1/N$, which is a single long multiplication of Z with the approximate reciprocal of N. The product of $T \cdot N$ is then subtracted from the accumulated value Z, which will reduce the accumulated value Z to within one or two times N of the required result. The reduction is then completed by subtracting the encryption modulus N one or two times more from the accumulated value Z until the remainder is less than N but not negative. This Modulo Reduction Algorithm requires two long multiplications and two subtractions instead of $10^{600}$ successive subtractions and is vital to render such calculations possible.

It is well known in the art that, since squaring is the same as multiplication with two equal arguments, advantage can be taken of the fact that half of the partial products to be summed are the same as the other half, allowing squaring to be performed twice as fast as multiplication. It is also known in the art that the product of two numbers A and B can be obtained from the difference in squares of (A+B) and (A−B).

In a published paper entitled "Multiplication of Multi Digit Numbers by Automata," by A. Karatsuba and Y. Ofman (Soviet Physics—Docklady 7, page 595–596, 1963), an algorithm, referred to herein as the K-O Multiplication Algorithm, is described for expressing the product of two N-digit numbers in terms of three products of N/2 digit numbers, thereby achieving a reduction to ¾ of the effort compared with four products of N/2 digit numbers needed conventionally. However, the N/2 multiplications are each, in turn, expressible as three N/4 digit multiplications, and so forth, so that the total reduction of effort is to the value $(3/4)^{\log_{2N}}$, as shown by D. E. Knuth in "The Art of Computer Programming, Vol. 2, Seminumerical Algorithms," (Addison Wesley, Reading, Mass., 1971). The above references are incorporated herein by reference.

To achieve the maximum reduction of effort using the K-O Multiplication Algorithm, the recursions should preferably stop at some wordlength where multiplication is more efficiently performed in the conventional manner or by special purpose hardware. Such a stage exists because the effort of multiplication reduces as the square of N while the overhead of the K-O Multiplication Algorithm reduces only linearly, so that at some wordlength, conventional multiplication becomes preferable.

The K-O Multiplication Algorithm has been used in software applications to perform long multiplication in public key cryptographic algorithms. Implementing the K-O Multiplication Algorithm in software suggests use of recursive programs. Recursion in this field refers to a program subroutine that is allowed to call itself, as opposed to simple iterations or loops. Recursion also includes the case of a first program calling a second program, which in turn calls the first program. In this case, no program calls itself but a compiler that supports recursion is necessary to give correct results when such recursive calls are used. Not all computer languages or implementations of computer programming languages support recursive subroutines.

Recursively structured hardware circuits for performing calculations are also known. Examples of recursively structured hardware circuits are described in U.S. Pat. No. 6,044,390 to Golnabi et al; U.S. Pat. No. 6,041,340 to Mintzer et al; and in U.S. Pat. No. 5,765,207 to Curran.

It is now common to employ a computer programming-like language known as VHDL to describe logic circuits of a higher complexity as interconnections of logic circuits of a lower complexity, and so forth, until only primitive circuits are required that can be found in an existing library. This hierarchical description of circuits is then translated by the VHDL compiler into a flat interconnection of primitive library elements. Present day VHDL is an example of a language that does not support recursive calls; that is, no circuit block in the hierarchy can include in its description a circuit block which is an instance of itself.

BRIEF SUMMARY OF THE INVENTION

The present invention relates to circuits for performing mathematical operations on long integer values. The circuit of the present invention may be used, for example, to square a long integer value or to multiply two long integer values. The circuit comprises a host processor and a co-processor. The host processor recursively reduces long integer values to be squared or multiplied into a set of reduced-length integer values that can be combined to obtain the final square or product. In the case of a squaring circuit, the square of a long integer value is expressed as a combination of squares of the reduced-length integer values. In a multiplying circuit, the product of two long integer values is expressed as a combination of products of the reduced-length integer values. The reduced-length integer values are passed to the co-processor to compute the square or products of the reduced-length integer values. The co-processor may also recursively reduce the reduced-length integer values to hard wordlength integer values that can be handled by a hardware logic circuit.

In another aspect of the invention, the long integer values, which may represent secret data, can be protected from disclosure by randomly ordering the reduced-length integer values passed from the host processor to the co-processor. The random ordering of the reduced-length integer values results in a random transposition of the bits of the secret data rendering it difficult to reconstruct the secret data by observing the value sent to the co-processor.

The present invention also comprises a method for designing hardware logic circuits that perform recursive computations. According to the design method, an indexing parameter is established. For values of the indexing parameter extending from a desired value to a minimum value, a recursive logic circuit is defined for a current value of the indexing parameter as interconnections between predefined logic circuits and one or more instances of the recursive logic circuit with the indexing parameter less than the current value. A base logic circuit is also defined for the minimum value of the indexing parameter. The definitions of the recursive logic circuits and base logic circuits are then processed for the desired value of the indexing parameter to produce a definition of the recursive logic circuit for the desired value of the indexing parameter in terms of predefined logic circuits.

DETAILED DESCRIPTION OF THE INVENTION

Figure 1:
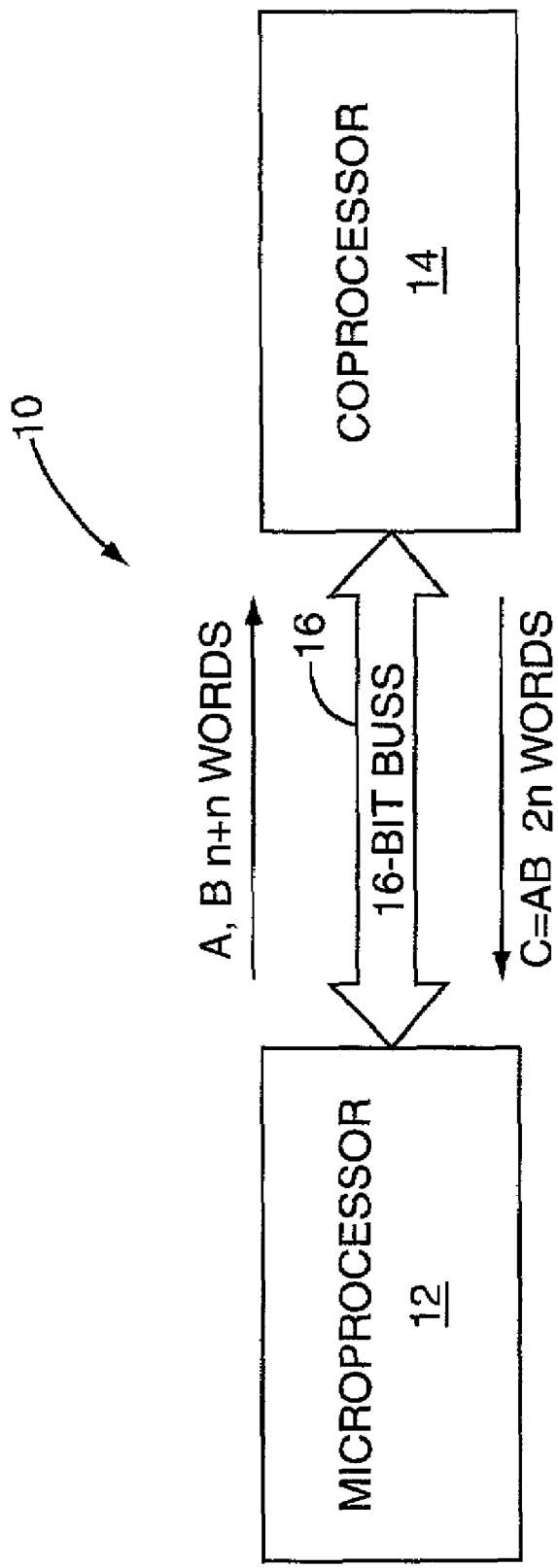
FIG. 1 is a block diagram of a circuit to perform multiplications of long integer values.

The present invention provides a circuit and method for efficiently performing arithmetic calculation s involving long integer values including squaring, multiplication, addition, and modulo reduction. The circuit and method can be used to implement the RSA Algorithm and the Diffie-Hellman Key Exchange Algorithm, both of which require multiplication and squaring of long integers. The circuit comprises a squaring circuit that implements a modified version of the Karatsuba-Ofman (K-O) Multiplication Algorithm. The squaring circuit may also be efficiently used for implementing multiplication of two dissimilar values. Thus, the present invention eliminates the need for a separate multiplication circuit, thereby saving silicon chip area and reducing cost as compared with circuits comprising only a multiplier that is also used for squaring or compared with circuits having both a multiplier and a squarer.

As indicated above, the squaring device of the present invention is based on the K-O Multiplication Algorithm. One possible expression of the K-O Multiplication Algorithm is as follows:

$$(2^k A2+A1)(2^k B2+B1)=2^{2k} A2 \cdot B2+A1 \cdot B1+2^k((A1+A2)(B1+B2)-A1 \cdot B1-A2 \cdot B2) \quad (Eq.\ 2)$$

The K-O Multiplication Algorithm can, alternately, be expressed as follows:

$$(2^k A2+A1)(2^k B2+B1)=2^{2k} A2 \cdot B2+A1 \cdot B1+2^k(A1 \cdot B1+A2 \cdot B2-(A1-A2)(B1-B2)) \quad (Eq.\ 3)$$

Both expressions of the K-O Multiplication Algorithm express a 2k digit multiplication in terms of three approximately k digit multiplications. In Equations 2 and 3, the values A1 and A2 represent the least significant half and most significant half respectively of a value A to be multiplied. Similarly, the values B1 and B2 represent the least significant half and most significant half respectively of a second value B to be multiplied with A.

In Equation 2, the multiplication (A1+A2)(B1+B2) is a k+1 digit multiplication due to the possible overflow to one extra bit from the additions. If it is desired to avoid k+1 bit multiplications, the overflow bits may be handled separately, as will be described below. Equation 3 attempts to avoid k+1 digit multiplications by multiplying the differences (A1−A2) and (B1−B2). However, if either A2 is greater than A1 or B2 is greater than B1, one of the factors would be negative. To retain unsigned multiplication, A2−A1 should be used when A2 is greater than A1 and B2−B1 should be used when B2 is greater than B1. If one difference only is reversed, the product (A2−A1)(B1−B2) or (A1−A2)(B2−B1) should be added to (A1·B1)+(A2·B2) instead of subtracted, as will also be demonstrated below.

Table 1 below gives a program listing in FORTRAN for a recursive multiplier implemented in software. The recursive multiplier of Table 1 multiplies quantities of length $N=2^n$ words using Equation 2. The line numbering in the program listing is for reference only.

TABLE 1

RECURSIVE MULTIPLICATION SUBROUTINE IMPLEMENTING EQ. 2

| LINE # | INSTRUCTION |
| --- | --- |
| 05 | SUBROUTINE RECURM (N,A,B,C,S) |
| 10 | INTEGER*2 S(*), A(*), B(*), C(*), BORROW |
| 15 | IF(N.EQ.1) THEN |
| 20 | CALL MUL16 (A(1),B(1),C) |
| 25 | ELSE |
| 30 | CALL RECURM (N/2,A,B,C,S,) |
| 35 | CALL RECURM (N/2,A(1+N/2),B(1+N/2),C(1+N),S) |
| 40 | CALL LONGAD(A,N/2,A(1+N/2),N/2,S, CARRY) |
| 45 | CALL LONGAD(B,N/2,B(1+N/2),N/2,S(N/2+2) CARRY) |
| 50 | CALL RECURM (N/2,S(1),S(2+N/2),S(N+3),S(2*N+5)) |
| 55 | NOVER2=N/2 |
| 60 | N1=1+NOVER2 |
| 65 | N2=N+N1+2 |
| 70 | S(N2+NOVER2)=0 |
| 75 | S(N2+NOVER2+1)=0 |
| 80 | IF (S(N1).EQ.1)CALL LONGAD(S(N1+1),NOVER2,S(N2), NOVER2,S(N2)) |
| 85 | IF(S(N+2).EQ.1)CALL LONGAD(S(1),N1,S(N2),N1,S(N2)) |
| 90 | CALL LONGSB(S(N+3),N+2,C(1),N,S(N+3),BORROW) |
| 95 | CALL LONGSB(S(N+3),N+2,C(1+N),N,S,(N+3),BORROW) |
| 100 | CALL LONGAD(S(N+3),N+1,C(N1),N2−3,C(N1)) |
| 105 | ENDIF |
| 110 | RETURN |
| 115 | END |

In line 5, a subroutine called RECURM is defined which accepts the arguments N, A, B, C, and S. Argument N specifies the wordlength of integer arrays A and B to be multiplied. Arguments A and B provide the starting addresses of two arrays that store the values A and B to be multiplied. Argument C provides the starting address of an array of length $2^N$(+1 spare location) to receive the product of the multiplication. Argument S provides the starting address of a stack array to be used as a work space.

At line 15, a test is performed to see if the multiplication required involves only one word variables, which can be efficiently performed by machine hardware. If so, the values A and B to be multiplied, which are stored in integer arrays A and B, are passed in a function call to a multiplication routine denoted MUL16 to perform this short multiplication. The multiplication routine MUL16 performs unsigned integer multiplication between, in this example, 16-bit operands to form a 32-bit result. High level languages, such as FORTRAN, PASCAL, or C, generally perform signed integer multiplication in their high level instructions, which must be circumvented to obtain unsigned multiplication. Table 2 below provides the program listing for an exemplary embodiment of the multiplication routine MUL16 which is included for completeness.

TABLE 2

MULTIPLICATION SUBROUTINE

| LINE # | INSTRUCTION |
|---|---|
| 05 | SUBROUTINE MUL16 (A,B,C) |
| 10 | INTEGER*2 A,B,C(8),AA(2),BB(2),CC(2) |
| 15 | INTEGER*4 A4,B4,C4 |
| 20 | EQUIVALENCE (A4, AA), (B4,BB), (C4,CC) |
| 25 | AA(2)=A |
| 30 | AA(1)=0 |
| 35 | BB(2)=B |
| 40 | BB(1)=0 |
| 45 | C4=A4*B4 |
| 50 | C(1)=CC(2) |
| 55 | C(2)=CC(1) |
| 60 | RETURN |
| 65 | END |

The multiplication routine of Table 2 could be replaced by a native assembly code routine to perform unsigned multiplication using the machine's hardware directly.

Returning to Table 1, if the multiplication involves variables greater than one word in length (i.e., N>1), the K-O Multiplication Algorithm is used to reduce the length of the variables to N/2. At line 30, the routine RECURM calls itself to multiply the least significant N/2 words A1 and B1 of values A and B to obtain A1·B1, which represents the least significant N words of the product A·B. The result is stored in result array C. At line 35, the routine RECURM calls itself again to multiply the most significant N/2 words A2 and B2 of values A and B (which start at element number 1+N/2 of integer arrays A and B) to obtain A2·B2, which represents the most significant N/2 words of the product A·B. The result is stored in array element 1+N of the result array C.

At lines 40 and 45, the program calls long integer addition routine LONGAD to perform the length N/2 additions A1+A2 and B1+B2 of Equation 2. The results are placed in the stack S. In particular, the result of the addition A1+A2 is placed in stack elements S(1) . . . S(N/2), with carry into elements S(1+N/2). The results of the addition B1+B2 are placed in stacked elements S(N/2+2) . . . S(N+1), with carry into element S(N+2). Thus, stack elements S(1) . . . S(N/2) contain the value of A1+A2 less its overflow or carry bit, while stack elements S(N/2+2) . . . S(N+1) contains the value of B1+B2 less its overflow or carry bit.

At line 50, the sums A1+A2 and B1+B2 minus the overflow or carry bits are multiplied by a third recursive call to the subroutine RECURM to obtain the product (A1+A2)(B1+B2) minus the contribution of the overflow/carry bits. The contributions of the carry bits, if any, are added in lines 80 and 85. Line 80 adds the absolute value of B1+B2 if the carry from the addition A1+A2 was set, and adds the absolute value of A1+A2 if the carry from the addition B1+B2 was set.

At lines 90 and 95, the already-computed products A1·B1 and A2·B2 are subtracted from the product (A1+A2)(B1+B2) according to Equation 2. At line 105, the processed value, now (A1+A2)(B1+B2)–A1·B1–A2·B2, is added with a shift of k-bits or N/2 words to the value contained in the result array C to obtain the final 2N word product.

At lines 55 through 75, the program precomputes some indices to simplify addressing. Use of local variables was thereby postponed until all recursive calls of the routine RECURM to itself were made. Otherwise, the values of the local variables would not be preserved through the recursive calls.

In the third recursive call, at line 50, it may be seen that the starting address S(2N+5) was passed to the routine LONGAD as the starting address of the stack array S. The address S(2N+5) addresses a place in the stack array beyond all the stack positions currently used to hold temporary results, so that the recursive call will not corrupt already-computed intermediate results whose use are later required. Moreover, the address S(2N+5) is beyond the position in the stack array S that will be used to receive the product of the recursive call.

In the routine of Table 1, there is a certain overhead involved in avoiding k+1 bit multiplications. This overhead could be avoided if the recursive routine was written to perform multiplications of arrays of any length, including odd lengths and powers other than 2, but this involves different overheads. Instead, the second form of the K-O Multiplication Algorithm shown in Equation 3 may be used.

Table 3 below is a program listing of a recursive multiplier implementing the form of the K-O Multiplication Algorithm shown in Equation 3.

TABLE 3

ALTERNATE RECURSIVE MULTIPLICATION SUBROUTINE

| LINE # | LABEL | INSTRUCTION |
|---|---|---|
| 05 | | SUBROUTINE RECURM (N,A,B,C,S) |
| 10 | | INTEGER*2 S(*), A(*), B(*), C(*), BORROW, LARGER |
| 15 | | INTEGER *4 N |
| 20 | | IF (N.EQ.1) THEN |
| 25 | | CALL MUL16 (A(1), B(1), C) |
| 30 | | ELSE |
| 35 | | CALL RECURM (N/2,A,B,C,S) |
| 40 | | CALL RECURM (N/2,A(1+N/2),B(1+N/2),C(1+N),S) |
| 45 | | IF (LARGER (A,A(1+N/2), N/2))1,2,3 |
| 50 | 1 | CALL LONGSB (A(1+N/2),N/2,A,N/2,S,BORROW) |
| 55 | | IF (LARGER (B,B(1+N/2),N/2))4,2,5 |
| 60 | 4 | CALL LONGSB (B(1+N/2),N/2,B,N/2,S(1+N/2), BORROW) |
| 65 | | GO TO 8 |
| 70 | 5 | CALL LONGSB (B,N/2,B(1+N/2),N/2,S(1+N/2), BORROW) |
| 75 | | GO TO 9 |
| 80 | 3 | CALL LONGSB (A,N/2,A(1+N/2),N/2,S, BORROW) |

TABLE 3-continued

ALTERNATE RECURSIVE MULTIPLICATION SUBROUTINE

| LINE # | LABEL | INSTRUCTION |
|---|---|---|
| 85 | | IF (LARGER (B,B(1+N/2),N/2))6,2,7 |
| 90 | 6 | CALL LONGSB (B(1+N/2),N/2,B,N/2,S(1+N/2), BORROW) |
| 95 | 9 | CALL RECURM (N/2,S(1),S(1+N/2),S(N+2),S(2*N+4)) |
| 100 | | CALL LONGAD (C,N,C(1+N),N,S) |
| 105 | | CALL LONGAD (S,N+1,S(N+2),N,S) |
| 110 | | GO TO 10 |
| 115 | 7 | CALL LONGSB (B,N/2,B(1+N/2),N/2,S(1+N/2), BORROW) |
| 120 | 8 | CALL RECURM (N/2,S(1),S(1+N/2),S(N+2),S(2*N+4)) |
| 125 | | CALL LONGAD (C,N,C(1+N),N,S) |
| 130 | | CALL LONGSB (S,N+1,S(N+2),N,S) |
| 135 | | GOTO 10 |
| 140 | 2 | CALL LONGAD (C,N,C(1+N),N,S) |
| 145 | 10 | CALL LONGAD (C(1+N/2),N+N/2,S,N+1,C(1+N/2)) |
| 150 | | ENDIF |
| 155 | | RETURN |
| 160 | | END |

At line 05, the subroutine RECURM and its arguments are defined as previously described. At line 20, the program performs a test to determine whether the multiplication can be performed in hardware by looking at the wordlength of the values A and B to be multiplied. If the values A and B have a wordlength of 1, the values to be multiplied are passed in a function call to the multiplication routine MUL16. If the values A and B have a wordlength greater than 1, the program makes recursive calls at lines 35 and 40 to compute A1·B1 and A2·B2, as previously described. At line 35, the program RECURM calls itself to perform N/2 word multiplication between the least significant N/2 words A1 and B1 of values A and B to obtain the least significant N/2 words of the product A·B, which is stored in result array C. At line 40, the program RECURM calls itself a second time to perform N/2 word multiplication between the most significant N/2 words A2 and B2 of values A and B to obtain the most significant N/2 words of the product A·B, which is stored in array element C(1+N) of the result array C. At line 45, the relative values of A1 and A2 are compared by an integer function denoted as LARGER. If A1=A2, the product (A1−A2)(B1−B2) will be 0 and a jump is made to the line denoted by label 2 (line 140), bypassing the steps of computing and multiplying B1−B2. At line 140, the already-computed products A1·B1 and A2·B2 are added together and the result is then added to the result array C with a shift of N/2 words at line 145, completing the 2N word product.

If, at line 45, the function LARGER indicates that A1 is greater than A2, the program jumps to label 3 (line 80) to compute the difference A1−A2. At line 85, the program compares B1 and B2. If B1 and B2 are equal, execution jumps to label 2 (line 140). As previously described, the already-computed products A1·B1 and A2·B2 are added at line 140 and the result is then added to the result array C with a shift of N/2 words at line 145 to arrive at the final 2N word product.

If, at line 85, the function LARGER indicates that B1 is greater than B2, execution jumps to label 7 (line 115). At line 115, the program computes the difference B1−B2. At line 120, the program computes the product of the differences A1−A2 and B1−B2. At line 125, the program computes the sum of the products A1·B1 and A2·B2. At line 130, the product computed at line 120 is subtracted from the sum computed at line 125, which is represented by the expression A1·B1+A2·B2−(A1−A2)(B1−B2). This result is then added to the result array C with a shift of N/2 words at line 145 to compute the final 2N word product.

If, at line 85, the function LARGER indicates that B2 is greater than B1, execution jumps to Label 6 (line 90) where the difference B2−B1 is computed. At line 95, the program calls itself to compute the product of the differences A1−A2 and B2−B1. At line 100, the sum of the products A1·B1 and A2·B2 is computed. Then, at line 105, the product computed in line 95 is added to the sum computed in line 100. The resulting value is represented by the expression A1·B1+A2·B2+(A1−A2)(B2−B1). This result is then added to the result array C at line 145 to compute the final 2N word product.

If, at line 45, the function LARGER indicates that A2 is greater than A1, the program jumps to label 1 (line 50). At line 50, the program computes the difference A2−A1. At line 55, the program compares B1 and B2. If B1 and B2 are equal, execution jumps to label 2 (line 140). At line 140, the already-computed products A1·B1 and A2·B2 are added. The result is then added to the result array C with a shift of N/2 words at line 145 to arrive at the final 2N word product.

If, at line 55, the function LARGER indicates that B1 is greater than B2, execution jumps to label 5 (line 70) where the difference B1−B2 is computed. At line 75, a jump is made to label 9 (line 95) where the product of the differences A2−A1 and B1−B2 is computed. At line 100, the sum of the products A1·B1 and A2·B2 is computed. Then, at line 105, the product computed in line 95 is added to the sum computed in line 100. The resulting value is represented by the expression A1·B1+A2·B2+(A2−A1)(B1−B2). This result is then added to the result array C at line 145 to compute the final 2N word product.

If, at line 55, the function LARGER indicates that B2 is greater than B1, execution jumps to label 4 (line 60) where the difference B2−B1 is computed. At line 65, the program jumps to label 8 (line 120). At line 120, the program makes a recursive call to compute the product of the differences A2−A1 and B2−B1. At line 125, the program computes the sum of the products A1·B1 and A2·B2. At line 130, the program adds the product computed in line 120 to the sum computed in line 125, which is represented by the expression A1·B1+A2·B2−(A2−A1)(B2−B1). At line 135, program execution jumps to label 10 (line 145). This result is then added to the result array C at line 145 to compute the final 2N word product.

Table 4 below is a program listing for the function LARGER which is used in the routine of Table 3.

TABLE 4

FUNCTION TO COMPARE TWO VALUES

| LINE # | LABEL | INSTRUCTION |
|---|---|---|
| 05 | | INTEGER*2 FUNCTION LARGER (X,Y,N) |
| 10 | | INTEGER*2 X(*),Y(*),X16(2),Y16(2) |
| 15 | | INTEGER*4 X32,Y32 |
| 20 | | EQUIVALENCE (X32,X16),(Y32,Y16) |
| 25 | | X16(1)=0 |
| 30 | | Y16(1)=0 |
| 35 | | DO 1 I=N,1,−1 |
| 40 | | X16(2)=X(I) |
| 45 | | Y16(2)=Y(I) |
| 50 | | IF (X32.NE.Y32) GO TO 99 |
| 55 | 1 | CONTINUE |
| 60 | | LARGER=0 |
| 65 | | RETURN |
| 70 | 99 | IF (X32.GT.Y32) THEN |
| 75 | | LARGER=1 |
| 80 | | ELSE |
| 85 | | LARGER=−1 |
| 90 | | ENDIF |
| 95 | | RETURN |
| 100 | | END |

The subroutine LARGER compares two values (e.g., A1 and A2), starting with the most significant word. If the most significant word of A1 is greater than that of A2, the comparison can stop there, otherwise the next most significant words must be compared. If all the words compared are equal, the result LARGER=0 is returned, signifying that A1=A2. By comparing most significant words first, the result is, in the majority of cases, obtained with only a one-word comparison, which is much quicker than comparing A1 and A2 by performing a long subtraction followed by a long negation if the result was negative to obtain the absolute value of A1−A2. The same procedure is used to compare B1 and B2.

In the exemplary LARGER routine, the 16-bit values are cast into 32-bit form with a most significant word of zero, in order to compare unsigned values. This high-level language routine could be replaced by an assembly code routine to gain access to the machine's native unsigned integer comparison instructions.

Equation 4 below is one expression for an efficient recursive long integer squaring algorithm.

$$(2^k A2 + A1)^2 = 2^{2k} A2^2 + A1^2 + 2^k((A1+A2)^2 - A1^2 - A2^2) \quad \text{(Eq. 4)}$$

Alternatively, the recursive long integer squaring algorithm may be expressed as follows:

$$(2^k A2 + A1)^2 = 2^{2k} A2^2 + A1^2 + 2^k(A1^2 + A2^2 - (A1-A2)^2) \quad \text{(Eq. 5)}$$

In Equations 4 and 5, A1 is the least significant part of A and A2 is the most significant part of A. In the first version of the recursive long integer squaring algorithm, the square $(A1+A2)^2$ is a k+1 squaring operation due to the possible overflow to one extra bit of the addition A1+A2. The second version of the recursive long integer squaring algorithm attempts to avoid this problem by squaring the difference of A1 and A2.

Table 5 below is a FORTRAN program listing implementing the first version of the recursive long integer squaring algorithm exemplified by Equation 4.

TABLE 5

RECURSIVE SQUARING SUBROUTINE

| LINE # | INSTRUCTION |
|---|---|
| 05 | SUBROUTINE RECSQR (N,A,ASQ,S) |
| 10 | INTEGER*2 S(*), A(*), ASQ(*), A16(2), BORROW |
| 15 | INTEGER*4 N,A32 |
| 20 | EQUIVALENCE (32, A16) |
| 25 | IF (N.EQ.1) THEN |
| 30 | A16(2)=A(1) |
| 35 | A16(1)=0 |
| 40 | A32=A32**2 |
| 45 | ASQ(1)=A26(2) |
| 50 | ASQ(2=A16(1) |
| 55 | ELSE |
| 60 | CALL RECSQR (N/2,A,ASQ,S) |
| 65 | CALL RECSQR (N/2,A(1+N/2), ASQ (N+1),S) |
| 70 | CALL LONGAD (A,N/2,A(1+n/2),N/2,S) |
| 75 | CALL RECSQR (N/2),S(1),S(2+N/2),S(N+N/2+3)) |
| 80 | NOVER2=N/2 |
| 85 | N1=NOVER2+1 |
| 90 | N2=N1+1 |
| 95 | NP2=N+2 |
| 100 | S(N/2+NOVER2)=0 |
| 105 | S(N/2+N1)=0 |
| 110 | IF (S(N1).EQ.1) THEN |
| 115 | CALL LONGAD (S(N/2),NOVER2,S(1),NOVER2,S(NP2)) |
| 120 | CALL LONGAD (S(N/2),N1,S(1),N1,S(N/2)) |
| 125 | ENDIF |
| 130 | CALL LONGSB (S(N2),N/2,ASQ(1),N,S(N2),BORROW) |
| 135 | CALL LONGSB(S(N2),NP2,ASQ(N+1),N,S(N2),BORROW) |
| 140 | CALL LONGAD (S(N2),N+1,ASQ(N1),N+NOVER2,ASQ(N1)) |
| 145 | RETURN |
| 150 | ENDIF |
| 155 | END |

At line 05, the subroutine RECSQR is defined with arguments N, A, ASQ, and S. The argument N is the wordlength of the value A to be squared. Argument A is the starting address of an array containing the value A to be squared. Argument ASQ is the starting address of an array to receive the result of the squaring operation. Argument S is the starting address of a stack to be used as a work space.

At line 25, the program performs a test to determine if the value A to be squared is a one-word value, in which case, the squaring operation can be performed conventionally in lines 30–50. If the value A to be squared is greater than one word, the program calls itself at line 60 and 65 to compute the squares $A1^2$ and $A2^2$. In line 60, the program squares A1, which represents the least significant N/2 words of A and places the result in the result array ASQ. In line 65, the program squares A2, which represents the N/2 most significant words of A and places the result in array element ASQ (N+1) of the result array ASQ. At line 70, the sum A1+A2 is computed by the long addition routine LONGAD. The N/2 word result is placed in the stack S in elements S(1) to S(N/2), with a carry or overflow bit in S(1+N/2). At line 75, a third recursive call is made to square the sum A1+A2, minus the overflow bit. If the overflow bit is detected to be set in line 105, the square is corrected in lines 110 and 115. In line 110, the sum A1+A2 is added to the most significant end of the square $(A1+A2)^2$. At line 115, the absolute value of (A1+A2) is added to the most significant end of the square $(A1+A2)^2$. The two already-computed squares $A1^2$ and $A2^2$ are then subtracted at lines 130 and 135, respectively, from the square $(A1+A2)^2$. The result, represented by the expression $(A1+A2)^2 - A1^2 - A2^2$, is then added to the result array ASQ at line 140 with a shift of k-bits or N/2 words, thus completing the 2N word square.

In the routine shown in Table 5, two extra calls to the LONGAD function are incurred when A1+A2 overflows to a (k+1)th bit. This overflow could be avoided by writing a routine to square an N word value where N is not constrained to be a power of 2. However, there are other overheads which are then encountered. Instead, the second recursive long integer squaring algorithm exemplified in Equation 5 can be used.

Table 6 below is a FORTRAN program listing to perform the second version of the recursive long integer squaring algorithm shown in Equation 5.

program proceeds at label 1 (line 80) to compute the difference A2–A1. After computing the difference A1–A2 in line 90 or A2–A1 in line 80, the program execution continues at label (line 95) with a recursive call to itself to compute the square of the difference A1–A2 or A2–A1. At line 100, the square of the difference between A1 and A2 is subtracted from the sum of the squares $A1^2$ and $A2^2$. This result is represented by the expression $A1^2+A2^2-(A1-A2)^2$. This result is then added at line 105 to result array ASQ with a left shift of N/2 words to complete the 2N word square.

TABLE 6

ALTERNATE RECURSIVE SQUARING SUBROUTINE

| LINE # | LABEL | INSTRUCTION |
|---|---|---|
| 05 | | SUBROUTINE RECSQR (N,A,ASQ,S) |
| 10 | | INTEGER*2 S(*), A(*), ASQ(*), A16(2), BORROW |
| 15 | | INTEGER*4 N,A32 |
| 20 | | EQUIVALENCE (A32,A16) |
| 25 | | IF (N.EQ.1) THEN |
| 30 | | A16(2)=A(1) |
| 35 | | A16(1)=0 |
| 40 | | A32=A32**2 |
| 45 | | ASQ(1)=A16(2) |
| 50 | | ASQ(2)=A26(1) |
| 55 | | ELSE |
| 60 | | CALL RECSQR (N/2,A,ASQ,S) |
| 65 | | CALL RECSQR (N/2,A(1+N/2),ASQ(N+2),S) |
| 70 | | CALL LONGAD (ASQ,N,ASQ(1+N),N,S) |
| 75 | | IF (LARGER(A,A(1+N/2),N/2))1,2,3 |
| 80 | 1 | CALL LONGSB (A(1+N/2),N/2,A,N/2,S(N+2), BORROW) |
| 85 | | GO TO 4 |
| 90 | 3 | CALL LONGSB (A,N/2,A(1+N/2),N/2,S(N+2), BORROW) |
| 95 | 4 | CALL RECSQR (N/2,S(N+2),S(N+n/2+2),S(2*N+N/2+3)) |
| 100 | | CALL LONGSB (S,N+1,S(N+N/2+2),N,S, BORROW) |
| 105 | 2 | CALL LONGAD (ASQ(1+N/2),N+N/2,S,N+1,ASQ(1+N/2)) |
| 110 | | ENDIF |
| 115 | | RETURN |
| 120 | | END |

In line 05, the subroutine RECSQR with arguments N, A, ASQ, and S is defined as previously described. At line 25, the program performs a test to determine whether the value A to be squared is a one-word value. If so, the square is performed conventionally in lines 30–50. Otherwise, the program calls itself in lines 60 and 65 to compute, respectively, $A1^2$ and $A2^2$. In line 60, the program computes $A1^2$ and stores the result in the result array ASQ. In line 65, the program computes $A2^2$ and stores the result in element ASQ (N+1) of the result array ASQ. The squares are then added at line 70 by calling the LONGAD routine and the sum $A1^2+A2^2$ is placed in the stack S at S(1) . . . S(N) with a possible overflow or carry bit in S(N+1).

At line 75, the values A1 and A2 are compared. If A1=A2, program execution jumps to label 2 (line 105), bypassing the unnecessary step of computing A1–A2. At line 105, the already-computed sum of the squares $A1^2$ and $A2^2$ is added to the result array ASQ with a left shift of N/2 words to obtain the final 2N word sequence.

If the function LARGER indicates that A1 is greater than A2 at line at line 75, the program jumps to label 3 (line 90) where the difference A1–A2 is computed. If instead, the function LARGER indicates that A2 is greater than A1, the In the third recursive call at line 95, the stack address S(2·N+N/2+3) is passed to the routine as the last argument to be used for work space. This address space is beyond the area of the stack used to hold the intermediate results, including the result of the third recursive call itself, which is placed in stack elements S(N+N/2+2) . . . S(2·N+N/2+1).

In all of the routines described above, the overhead in computing indices is reduced when smart, optimizing compliers are used, which replace integer division or multiplication by 2 with shifts, and avoid computing the same value more than once in the same statement. This overhead is also of less significance at the stage of recursion where longer squares and adds or subtracts are being performed, but is of significance at the recursion stage where single word squares are performed. Thus, it is desirable to perform these lower stages of recursion by specially-designed hardware up to the longest wordlengths for which the hardware complexity is affordable in a given application. The software recursions are then used only for longer wordlengths.

The subroutines shown in Tables 5 and 6 can be modified to utilize external hardware. Table 7 below is a modified version of the program shown in Table 6 implementing the second version of the recursive long integer squaring algorithm.

TABLE 7

RECURSIVE SQUARING SUBROUTINE WITH HARDWARE CALL

| LINE # | LABEL | INSTRUCTION |
|---|---|---|
| 05 | | SUBROUTINE RECSQR(N,A,ASQ,S) |
| 10 | | INTEGER*2 S(*),A(*),ASQ(*),A16(2),BORROW |
| 15 | | INTEGER*4 N,A32 |
| 20 | | EQUIVALENCE (A32,A16) |
| 25 | | IF(N.LE.8)THEN |
| 30 | | CALL HARDWARE(A,ASQ) |
| 35 | | ELSE |
| 40 | | CALL RECSQR(N/2,A,ASQ,S) |
| 45 | | CALL RECSQR(N/2,A(1+N/2),ASQ(N+1),S) |
| 50 | | CALL LONGAD(ASQ,N,ASQ(1+N),N,S) |
| 55 | | IF(LARGER(A,A(1+N/2),N/2))1,2,3 |
| 60 | 1 | CALL LONGSB(A(1+N/2),N/2,A,N/2,S(N+2),BORROW) |
| 65 | | GO TO 4 |
| 70 | 3 | CALL LONGSB(A,N/2,A(1+N/2),N/2,S(N+2),BORROW) |
| 75 | 4 | CALL RECSQR(N/2,S(N+2),S(N+N/2+2),S(2*N+N/2+3)) |
| 80 | | CALL LONGSB(S,N+1,S(N+N/2+2),N,S,BORROW) |
| 85 | 2 | CALL LONGAD(ASQ(1+N/2),N+N/2,S,N+1,ASQ(1+N/2)) |
| 90 | | ENDIF |
| 95 | | RETURN |
| 100 | | END |

In this modified version of the recursive squaring routine, the wordlength test at line 25 is modified. In particular, the modified subroutine performs a test at line 25 to determine whether the wordlength of the value A being squared is less than or equal to the maximum wordlength that can be handled by the hardware. In the given example, the maximum wordlength that can be handled by the hardware is eight words. If the wordlength of A is less than or equal to 8, the program calls a hardware routine denoted HARDWARE to perform squaring of the value A. Alternatively, an efficient assembly code routine for computing eight word squares could be called in line 30. Otherwise, if N is greater than the maximum wordlength that can be handled by the hardware, software recursion is performed as previously described. Lines 40–100 in the subroutine shown in Table 7 are identical to line 60-120 of the subroutine shown in Table 6.

Since many squares have to be computed to raise a long integer to a long power, hardware may be employed to assist the software routines to accelerate the computation of squares, as is exemplified in Table 7. The squaring hardware could perform squares of the longest affordable wordlength. Since a squarer is simpler than a multiplier, squarers of a longer wordlength than a multiplier of equivalent complexity can be constructed. If a hardware multiplier also has to be provided, the affordable chip area would have to be shared between a multiplier and a squarer of shorter wordlength than a squarer alone. Therefore, according to the present invention, hardware is provided to perform squaring with the longest possible wordlength, and the squarer is used to accelerate multiplication by using the difference between two squares technique for multiplying, which is illustrated by the program listing in Table 8.

TABLE 8

MULTIPLICATION SUBROUTINE USING DIFFERENCE OF SQUARES TECHNIQUE

| LINE # | LABEL | INSTRUCTION |
|---|---|---|
| 05 | | SUBROUTINE RECMUL (N,X,Y,Z,STACK) |
| 10 | | INTEGER*2 X(*),Y(*),Z(*),STACK(*),BORROW,CARRY,LARGER |
| 15 | | N2=2*N |
| 20 | | N1=N2+1 |
| 25 | | N2P1=2*N+2 |
| 30 | | IF(LARGER(X,Y,N))3,2,1 |
| 35 | 1 | CALL LONGAD(X,N,Y,N,STACK) |
| 40 | | CALL LONGSB(X,N,Y,N,STACK(N+2),BORROW) |
| 45 | | CALL LSHFTR(STACK,N2P1−1,CARRY) |
| 50 | | CALL RECSQR(N,STACK(1),Z,STACK(N2P1)) |
| 55 | | CALL RECSQR(N,STACK(N+2),STACK(N2P1),STACK(N2P1+N1)) |
| 60 | | CALL LONGSB(Z,N2,STACK(N2P1),N2,Z,BORROW) |
| 65 | | IF(CARRY.NE.0)CALL LONGAD(Z,N2,Y,N,Z) |
| 70 | | RETURN |
| 75 | 2 | CALL RECSQR(N,X,Z,STACK) |
| 80 | | RETURN |
| 85 | 3 | CALL LONGAD(X,N,Y,N,STACK) |
| 90 | | CALL LONGSB(Y,N,X,N,STACK(N+2),BORROW) |
| 95 | | CALL LSHFTR(STACK,N2P1−1,CARRY) |
| 100 | | CALL RECSQR(N,STACK(1),Z,STACK(N2P1)) |
| 105 | | CALL RECSQR(N,STACK(N+2),STACK(N2P1),STACK(N2P1+N1)) |

TABLE 8-continued

MULTIPLICATION SUBROUTINE USING
DIFFERENCE OF SQUARES TECHNIQUE

| LINE # | LABEL | INSTRUCTION |
|---|---|---|
| 110 | | CALL LONGSB(Z,N2,STACK(N2P1),N2,Z,BORROW) |
| 115 | | IF(CARRY.NE.0)CALL LONGAD(Z,N2,X,N,Z) |
| 120 | | RETURN |
| 125 | | END |

Table 8 is a program listing in FORTRAN for a subroutine denoted RECMUL that performs multiplication using the difference between two squares technique. The subroutine is defined at line 05 which accepts the arguments N, X, Y, Z, and STACK. Argument N specifies the wordlength of the values X and Y to be multiplied. Arguments X and Y give the starting addresses for two integer arrays that store the values X and Y. Argument Z provides the starting address of a 2N word array to receive the result of the multiplication. The argument STACK provides the starting address of a work space stack to store temporary results.

At line 30, the values X and Y are compared to determine which is larger. If the stored values are equal, the desired product is simply $X^2$ or $Y^2$, which is computed by jumping to statement label 2 (line 75). At line 75, the program calls the recursive square subroutine shown in Table 6 or 7 and returns the result at line 80.

If, at line 30, the function LARGER determines that X is greater than Y, then execution proceeds at label 1 (line 35). At line 35, the sum of X and Y is computed by the LONGAD subroutine. The difference X−Y is then computed at line 40 by the LONGSB subroutine. The sum X+Y is stored in stack elements S(1) to S(N) with a possible overflow bit in stacks element (N+1). The difference X−Y is stored in stack elements S(N+2) to S(2N+1). At line 45, the entire array stack S(1) to S(2N+1) is then right shifted one bit by long right shift subroutine LSHFTR to form (X+Y)/2 and (X−Y)/2. This shifting operation incorporates the overflow bit from X+Y but drops the least significant bit. The recursive squares routine of Tables 6 or 7 is then called at lines 50 and 55 to compute the squares of (X+Y)/2 and (X−Y)/2, respectively. The first square computed at line 50 is added to the result array Z. The second square computed at line 55 is placed in the array STACK. At line 60, the second square is subtracted from the first square and the result is placed in the result array Z.

At line 65, a test is performed to determine whether the dropped least significant bit is "0". If X+Y and X−Y are both even, the dropped least significant bit is 0 and can, therefore, be forgotten. In this case, the result stored in array Z is returned at line 70. On the other hand, if X+Y and X−Y are both odd, the dropped least significant bit is "1". In this case, the difference of the squares computed in line 60 will be short of the desired product XY by the value of Y. Consequently, if it is determined at line 65 that the dropped least significant bit is a "1", Y must be added to complete the desired product.

If at line 30, the subroutine LARGER determines that Y is larger than X, program execution jumps to statement label 3 (line 85). At line 85, the sum X+Y is computed by the subroutine LONGAD and, at line 90, the difference Y−X is computed by the subroutine LONGSB. The sum X+Y is placed in stack elements S(1) . . . S(N) with a possible overflow bit in stack element S(N+1). The difference Y−X is placed in stack elements S(N+2) . . . S(2N+1). The entire array stack S(1) . . . S(2N+1) is then right shifted one bit by long right shift subroutine LSHFTR to form (X+Y)/2 and (Y−X)/2 which includes the overflow bit from X+Y but drops the least significant bit. The recursive squares routine of Table 6 or 7 is then called in lines 100 and 105 to form the squares of (X+Y)/2 and (Y−X)/2, respectively. At line 110, the difference of the two squares is computed and then a test is performed at line 115 to determine whether the dropped least significant bit affects the final product. If the least significant bit is a "0", the least significant bit can be ignored. If, on the other hand, the least significant bit is a "1", the long integer addition subroutine LONGAD is called to add the value of X to the result array Z to obtain the final product.

The subroutine in Table 8 is not recursive but calls the recursive squares subroutine of Table 6 or 7. Thus, variables local to RECMUL are not destroyed by the call to REQSQR. Moreover, the subroutine RECMUL executes only once with N equal to the whole variable length, so addressing overhead is insignificant. The efficiency of multiplication using the difference between two squares is, thus, almost entirely governed by the efficiency of the squaring routine RECSQR.

Referring now to the drawings, FIG. 1 shows a circuit to perform long multiplications of lengths N words. Circuit 10 comprises a microprocessor 12 and co-processor 14 connected by a 16-bit buss 16. To perform multiplication of N word values, where N is greater than the maximum value n that can be multiplied by co-processor 14, the co-processor 14 must be invoked numerous times to perform the N word multiplication. Each time the co-processor 14 is used to multiply an n word value A with another n word value B, the n words of A and the n words of B have to be output from the microprocessor 12 to the co-processor 14 and then the 2n word result has to be input to the microprocessor 12 from the co-processor 14. Assuming that the buss is one 16-bit word wide, 4n buss transactions would be involved in each n word multiplication. The co-processor 14 would likely perform the multiplication in one cycle. The buss delay would be in the order of 4n cycles.

The I/O interface would preferably be organized as a direct memory access (DMA) channel that takes place independently of microprocessor instruction execution so that the microprocessor 12 could process the previous multiplication while the next multiplication was being performed by the co-processor 14. The time to perform an n word multiplication using conventional techniques would, therefore, be $(N/n)^2 \cdot 4n$ cycles, assuming partial product accumulation could take place in microprocessor 12 in parallel with each n word multiplication. Using the K-O Multiplication Algorithm, however, the N word multiplication can be completed in $3^{\log_2(N/n)} \cdot 4n$ cycles. For n=8 and N=128, for example, the conventional multiplication with the aid of co-processor 14 takes 256·4n cycles. In contrast, multiplication employing the K-O Multiplication Algorithm takes 81·4n cycles; reducing the effort by a factor more than "3".

Figure 2:
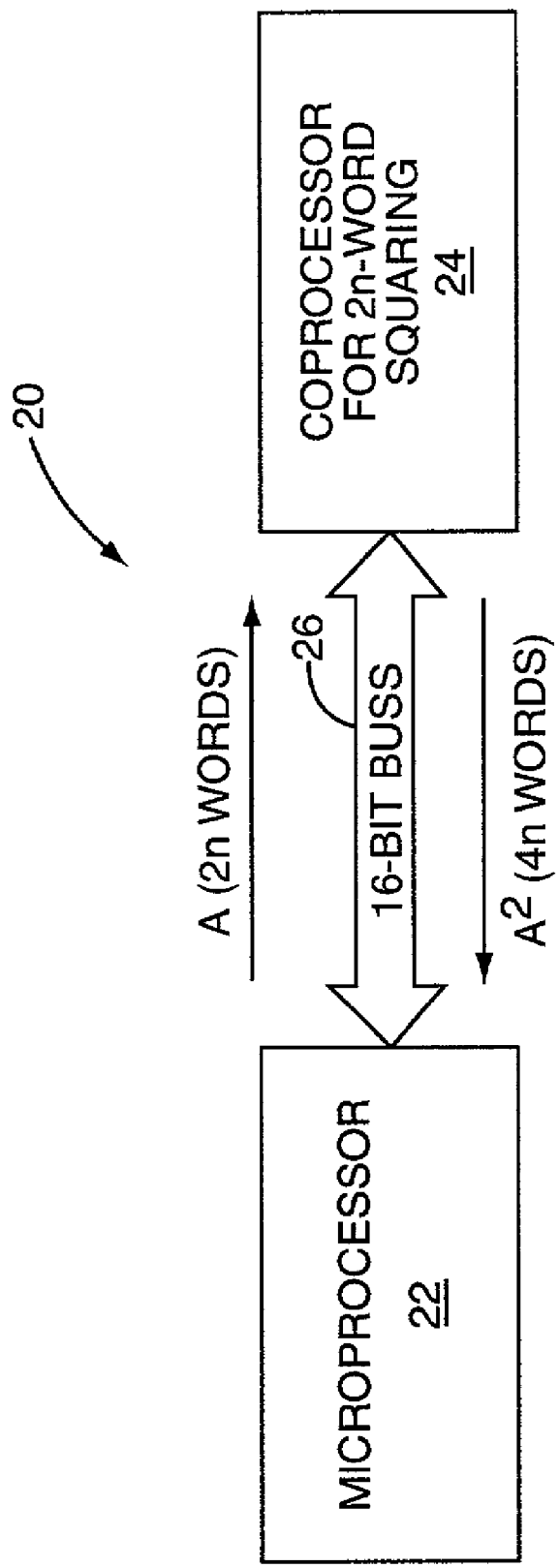
FIG. 2 is a block diagram of a circuit to square a long integer value.

FIG. 2 illustrates a circuit 20 for squaring 2n word values. Circuit 20 comprises a microprocessor 22 and co-processor 24 connected by a buss 26. The co-processor 24 squares a 2n word value for similar cost and complexity of a multiplier that multiplies n word values. The transfer of the value to be squared from the microprocessor 22 to the co-processor 24 would take the same 2n buss cycles. The resulting value, however, is longer, being approximately 4n words. Thus, one 2n word square requires 6n buss cycles.

To perform a 2n word square using the n-by-n word multiplier of FIG. 1 would, in contrast, require 16n buss cycles using conventional multiplication, or 12n cycles using K-O Multiplication. Thus, computing a long square using the circuit 20 shown in FIG. 2 is faster than computing a long square using the circuit 10 of FIG. 1 for the same co-processor chip complexity. Since public key algorithms involve many squaring operations, it is advantageous to use the circuit architecture of FIG. 2 rather than FIG. 1 in cryptographic calculations.

Public key algorithms also require many multiplications. Using the circuit architecture of FIG. 2, a multiplication of two 2n words is performed by computing two 2n word squares and taking the difference, as shown in Table 8. The two 2n word squares require 12n buss transactions. To compute a 2n by 2n word product using the circuit architecture of FIG. 1 and the K-O Multiplication Algorithm requires the computation of three n·n products, each of which takes 4n buss transactions for a total of 12n transactions. Therefore, there is no disadvantage in terms of I/O delay between the circuit architectures of FIGS. 1 and 2 for multiplication. Therefore, utilizing a co-processor 24 optimized for squaring as shown in FIG. 2 improves the efficiency for computing squares without reducing the efficiency for performing multiplications.

In U.S. patent application Ser. No. 09/695,958 filed Oct. 25, 2000 entitled "Safe Use of an Insecure Cryptoaccelerator," the need to hide the true value of secret data that must be processed by an external coprocessor is discussed. In the above-identified application, the secret data was the private key in a public key cryptosystem. The above-identified application is incorporated herein by reference.

If it is desired to protect the values that are passed to the co-processor 24, various methods may be used to conceal those values. For example, suppose that the co-processor 24 of FIG. 2 implements the squaring routine of Table 7. Further suppose that the co-processor 24 is used to square a secret message string. The secret message string may be broken into its least significant half and its most significant half, which are then squared by recursive calls to the subroutine RECSQR. These values are then broken down into quarters, and so forth. However, there is no requirement to square the most significant half before the least significant half or vice versa. Therefore, it is possible to incorporate a random switch that will randomly choose, separately at each recursion, whether the most or least significant half is squared first. When the recursion eventually reaches a length that can be performed by the co-processor 24, the order in which the fragments of the original message string are sent to the co-processor 24 will be unknown. Thus, a random transposition of the bits of the secret message string will have occurred, rendering it difficult to reconstruct the message string by observing the values sent to the co-processor 24. This difficulty is substantially increased if the third recursive call is also randomly ordered with the first two, which can be done at the expense of greater utilization of temporary stack space. For example, the routine of Table 7 could be rewritten, in one implementation, to incorporate six different sequences of program steps, each with their own stack indexing, and corresponding to the six different orders in which the three recursive calls could be made. A random number from "1" to "6" would select one of the sequences for each recursion. Then, it would not be known whether data sent to the co-processor 24 was a message segment of A1 or A2 or a segment of |A1−A2|. Thus, the task of determining the secret message string from a secure microprocessor 22 to an insecure co-processor 24 can be rendered much more difficult. The random ordering of the reduced length squares is preferably determined by an unpredictable, random noise generator. For example, a random signal can be generated by sampling and quantizing a random noise signal whenever a random bit or value is needed.

The squaring co-processor 24 of FIG. 2 may be constructed internally, using the recursive squaring algorithm of Table 7, for example, to express the 2n word square in terms of three n word squares which are added and subtracted as shown in Equation 5. These n word squares, in turn, may be expressed as three n/2 word squares, and so forth, until the wordlength is reached for which a hardware squaring circuit is more compact.

It is commonplace to design logic circuits using a software tool called Very High Level Design Language or VHDL. VHDL allows circuits to be defined as a hierarchy of interconnections between lower level circuit blocks to form higher level circuit blocks. However, VHDL using recursive definition of logic circuits may provide an even greater reduction in the design effort required. Recursive algorithms, such as the K-O Multiplication Algorithm, can be described in recursive VHDL code such that a circuit block for performing n-by-n word multiplication can be described as interconnections between three circuit blocks that perform n/2·n/2 word multiplications. Recursive VHDL code would then rely on itself to fill in the definitions of the n/2-by-n/2 word multipliers in terms of n/4-by-n/4 word multipliers, and so forth. Ultimately, a specific design must be provided for a multiplier at the wordlength where a specific design is more efficient than allowing the recursion to continue to an even shorter wordlength.

Likewise, recursive VHDL code can be used to describe a 2n word squaring circuit in terms of three interconnected n word squaring circuits, analogous to the program of Table 7. Ultimately, the wordlength is recursively reduced to a length for which a specific squaring circuit is more efficient than allowing the recursion to continue to an even shorter wordlength. Even then, the use of recursive VHDL can reduce the effort in describing a squaring circuit. For example, an M-bit value to be squared may be expressed as follows:

$$X_M = 2^{M-1} B_{M-1} + 2^{M-2} B_{M-2} + 2^{M-3} B^{M-3} \ldots + 2B1 + B0 \quad \text{(Eq. 6)}$$

The square of $X_M$ can then be expressed as follows:

$$X_M^2 = (2^{M-1} B_{M-1} + X_{M-1})^2 = X_{M-1}^2 + 2^M B_{M-1} (2^{M-2} + X_{M-1}) \quad \text{(Eq. 7)}$$

Equation 7 is a recursive definition of an M-bit square in terms of an M−1 bit square, with the addition of an extra term to the M−1 bit square if $B_{M-1}$ is equal to binary "1".

Figure 3:
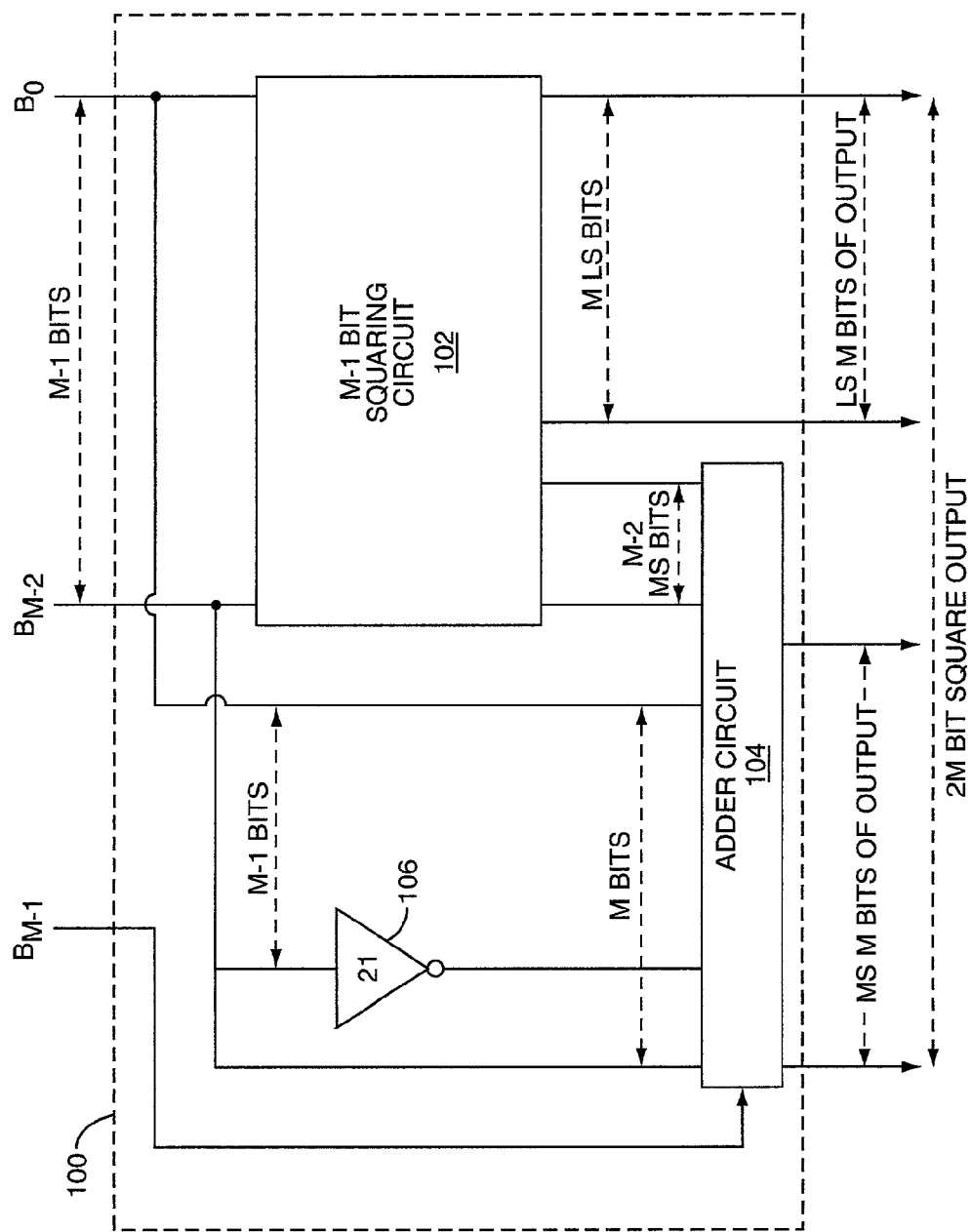
FIG. 3 is a recursive squaring circuit according to the present invention.

FIG. 3 is a squaring circuit 100 implementing the recursive squaring algorithm of Equation 7. The recursive squaring circuit 100 comprises an M−1 bit squaring circuit 102, adder circuit 104, and inverter 106. Squaring circuit 100 receives an input of M-bits and generates an output of 2M-bits equal to the square of the M-bit input value. The least significant M−1 bits of the input are connected to the M−1 bit squaring circuit 102, which provides a 2M−2 bit output. The M least significant bits output from squaring circuit 102 become the least significant M output bits of the squaring circuit 100. The M−2 most significant bits output from the squaring circuit 102 are input to adder circuit 104. The other input to the adder circuit 104 is an M-bit value representing the term $2^{M-2}+X_{M-1}$ which is equal to the term $X_{M-1}$ with a "1" added to its most significant bit position $B_{M-2}$. If the most significant bit $B_{M-2}$ is a binary "1", then adding "1" will result in a binary "0" plus a carry bit, the carry bit being a "1" in the bit position $B_M$. On the other hand, if $B_{M-2}$ is a binary "0", then adding "1" generates a "1" at the bit position $B_{M-2}$ and a "0" carry. Thus, the top two bits of the M-bit term are given by $B_{M-2}$ and its inverse, which is formed by inverter 106. Adder circuit 104 is enabled to add when the most significant bit $B_{M-1}$ is a binary "1". Otherwise, adder circuit 104 merely outputs the M−2 bits from squaring circuit 102, extended to M-bits by two "0"s in the two most significant bit positions.

A VHDL compiler is assumed to already contain definitions for adder circuit 104 and inverter 106. When faced with the need to fill in the details of the M−1 bit squaring circuit 102, however, a recursive VHDL compiler will use the definition of the M-bit squarer 100 with M reduced to M−1. Ultimately, a one bit squarer will be required with a two bit output. The two bit output comprises the input bit and "0". The recursion could stop at a higher level, for example, two bits in and four bits out by defining a suitable logic circuit. The two bit squarer does not need adder circuit 104, as the number of bits from the one bit squarer to be added is "0". The adder circuit 104 for the two bit squarer can be replaced with a two bit NAND gate to either pass $B_0$ and its inverse to the two most significant bits of the four bit output, or else output "0"s.

Figure 4:
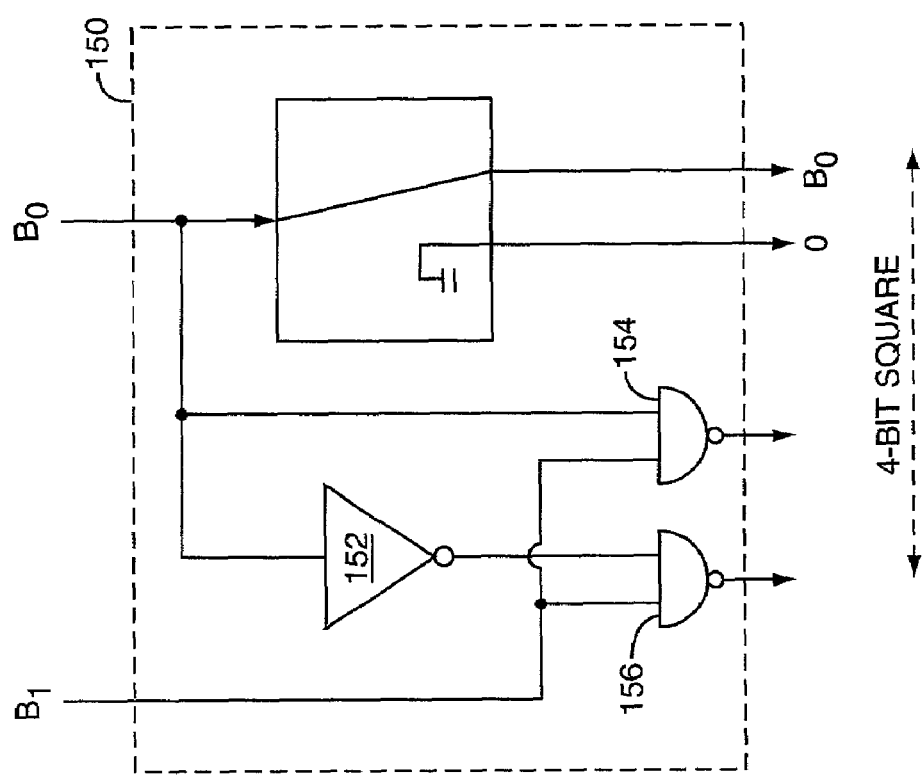
FIG. 4 is a block diagram of a hardware logic circuit to square two bits values.

An elementary two bit squarer denoted generally by the numeral 150 is shown in FIG. 4. The two bit squarer 150 comprises an inverter 152 and a pair of NOR gates 154 and 156.

By adopting recursive definitions of logic circuits, the designer can describe the additional logic needed to extend a circuit for operating on length N variables to a circuit for operating on length N+1 variables. The additional logic is comprised of standard library modules. Then, together with a suitable logic circuit design for a trivial N, such as "1" or "2", the recursive VHDL compiler does the bulk of the design work.

The complexity of the recursive bit $Y^2$ of FIG. 3 may be expressed as follows:

$$C(N)=C(N-1)+24(N-2)+4N+20+1 \quad \text{(Eq. 8)}$$

In Equation 8, C(N) is the number of gate inputs.

The above formula derives from assigning a complexity of twenty-four gate inputs to a full adder with carry, of which circuit 100 needs N−2; four gate inputs to inhibit an adder input, of which circuit 100 needs N; ten gate inputs to a carry propagator, of which circuit 100 needs two; and one gate input to the inverter. Dividing C(N) by twenty four gives the equivalent complexity in terms of full adder cells as follows:

| N | COMPLEXITY |
|---|---|
| 2 | 0.2 |
| 4 | 6.125 |
| 8 | 32 |
| 16 | 140 |
| 32 | 579 |
| 64 | 2354 |

Figure 5:
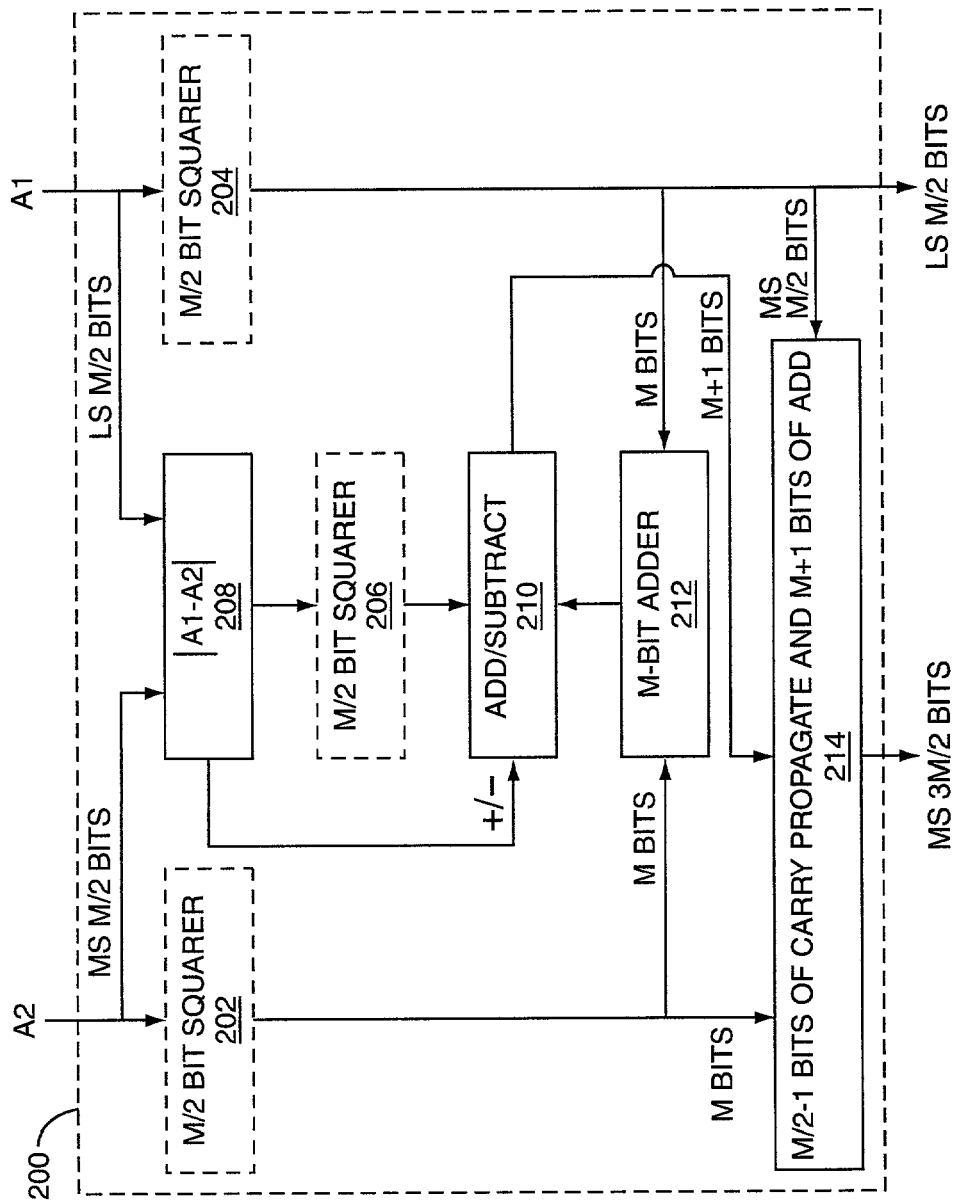
FIG. 5 is an alternate embodiment of a recursive squaring circuit according to the present invention.

FIG. 5 illustrates a recursive squaring circuit according to another embodiment of the present invention. The squaring circuit 200 of FIG. 5 squares an M-bit input and provides a 2M-bit output. The squaring circuit 200 comprises three M/2 bit squarers 202, 204, and 206, a subtractor 208, and adders 212 and 214. The most significant M/2 bits, denoted A2, of the M-bit input A is squared in M/2 bit squarer 202, while the M/2 least significant bits, denoted A1, are squared in M/2 bit squarer 204. Each M/2 bit squarer 202 and 204 produces M-bits of output. The M/2 least significant bits of A1$^2$ are output as the M/2 least significant bits of the final square A$^2$.

Subtractor 208 computes the modulus difference |A1−A2| and determines the sign of A1−A2. For example, the subtractor 208 may form A1−A2, and, if a "borrow" occurs in the last stage of the subtraction, the complement +1 is used as the output, which would then be equal to A2−A1. The complement +1 may be performed by a carry propagator which has a complexity of about 0.4 adder cells per bit. Thus, the complexity of subtractor 208 is approximately 1.4M/2, which equals 0.7M adder cells. The complexity may be further reduced by employing the technique disclosed in U.S. Pat. No. 5,251,164 by Dodson et al, which is incorporated herein by reference.

M-bit adder 212 adds A1$^2$, which is output by squarer 204, and A2$^2$, which is output by squarer 202, to produce an M+1 bit result. The complexity of adder 212 is, thus, M adder cells.

The modulus difference output from subtractor 208 is squared by M/2 bit squarer 206 to produce an M-bit square, which is either added to or subtracted from the output of M-bit adder 212. Adder/subtractor 210 is controlled by a sign output from subtractor 104. When the sign output by subtractor 208 is a plus, adder/subtractor 210 adds the two values. Conversely, when the sign output by subtractor 208 is a minus, adder/subtractor 210 subtracts the two values. The complexity required to successfully negate the M-bits from adder 212 is about 0.25 adder cells per bit, so the complexity of adder/subtractor 210 is approximately 1.25M adder cells.

Finally, the M+1 bits output from adder/subtractor 210 are added to the 3M/2 bits comprised of the M/2 most significant bits of A1$^2$ and the M-bits of A2$^2$ output by squarer 202. This addition requires M+1 bits of full adder and M/2−1 bits of carry propagation. The final adder complexity is thus of the order (M+1)+0.4(M/2−1) full adder cells.

The complexity of the squaring circuit 200 of FIG. 5 can be expressed by the following recursive expression:

$$C(M)=3C(M/2)+0.7M+M+(M+1)+0.4(M/2+1)=3C(M/2)+2.9M+1.4 \quad \text{(Eq. 9)}$$

As a starting point in determining the complexity of a given squaring circuit 200 according to FIG. 5, one begins with the complexity C(M) of any of the bitwise squarers, the complexity of which is already computed. For example, starting with C(2)=0.2, Equation 9 gives a complexity for M=4 of 13.6 adder cells. However, the bitwise recursion gave a complexity of only 6 adder cells; therefore, the bitwise 4-bit squarer should be used as the starting point for higher order squarers. Using C(4)=6.125, the complexity of the squaring circuit 200 is found to be approximately 43 adder cells, which is still higher than a bitwise 8-bit squarer, the complexity of which is approximately 32 adder cells. Using C(8)=31.958, the complexity of the squaring circuit 200 of FIG. 5 is computed to be 143 adder cells, still higher than the 140 adder cells required by a bitwise squarer. Using C(16)=139.625 for the bitwise squarer as a starting point for the squaring circuit 200, it is found that C(32) is approximately 513 adder cells for the squaring circuit 200, which is lower than the 579 adder cells required for bitwise squaring. At 64 bits, the squaring circuit 200 of FIG. 5 has a complexity of 1726, which is a significant reduction on the 2354 adder cells required for bitwise squaring, and the advantage for the squaring circuit 200 as compared to a bitwise squarer improves as the number of bits increase. Based on these calculations, it appears advantageous to define a bitwise recursive 16-bit squarer, which is then employed in sets of three using recursion as disclosed herein to define squarers of longer wordlength. It may be realized from FIG. 5 that the technique of recursive VHDL may also be used to describe an M-bit squarer in terms of standard library gates and three M/2-bit squarers.

Prior art VHDL compilers do not support recursive definition of logic circuits. An example of recursive VHDL code that is not supported by present VHDL compilers is given in Table 9 below, which is an implementation of the circuit shown in FIG. 3.

TABLE 9

VHDL CODE FOR RECURSIVE SQUARING CIRCUIT

| LINE # | INSTRUCTION |
|---|---|
| 05 | entity M_BIT_SQUARER is |
| 10 | generic(M:INTEGER) |
| 15 | port(XIN:in BIT_VECTOR(0 to M−1); |
| 20 | XOUT:out BIT_VECTOR(0 to 2*M−1)); |
| 25 | end M_BIT_SQUARER; |
| 30 | architecture BIT_REC_SQR of M_BIT_SQUARER is |
| 35 | generic(M:INTEGER) |
| 40 | if M=2 then |
| 45 | component INVERTOR |
| 50 | port(Z:in BIT; ZBAR:out BIT); |
| 55 | end component |
| 60 | component NAND2 |
| 65 | port(A1,A2:in BIT; A1A2:out BIT); |
| 70 | end component |
| 75 | signal ZBAR:BIT |
| 80 | begin |
| 85 | GATE1:INVERTOR port map(XIN(0),ZBAR) |
| 90 | GATE2:NAND2 port map(XIN(1),XIN(0),XOUT(2)) |
| 95 | GATE3:NAND2 port map(XIN(1),ZBAR,XOUT(3)) |
| 100 | XOUT(1)<="0" |
| 105 | XOUT(0)<=XIN(0) |
| 110 | else |
| 115 | component ENABLED_ADDER |
| 120 | generic(N:INTEGER); |
| 125 | port(A:in BIT_VECTOR(0 to N−1); |
| 130 | B:in BIT_VECTOR(0 to N−1); |
| 135 | ENABLE:in BIT; |
| 140 | C:out BIT_VECTOR(0 to N−1); |
| 145 | CARRY:out BIT |
| 150 | end component |
| 155 | component ENABLED_HALF_NADDER |
| 160 | port(BM1,BM2,CF:in BIT;XM1,XM2:out BIT); |
| 165 | end component |
| 170 | component M_BIT_SQUARER |
| 175 | generic(MM1:INTEGER); |
| 180 | port(X:in BIT_VECTOR(0 to MM1−1); |
| 185 | XSQ:out BIT_VECTOR(0 to 2*MM1−1); |
| 190 | end component |
| 195 | signal XSQ:BIT_VECTOR(0 to 2*M−3);CARRY:BIT |
| 200 | begin |
| 205 | BLOCK1:ENABLED_ADDER generic map(M−2) port map(XSQ(M),XIN,XOUT(M)) |
| 210 | BLOCK2:ENABLED_HALF_NADDER |
| 215 | port map(XIN(M−1),XIN(M−2),CARRY,XOUT(2*M−2),XOUT(2*M−1)); |
| 220 | BLOCK3:M_BIT_SQUARER generic map(M−1) port map(XIN,XSQ) |
| 225 | for I in 0 to M−1 loop |
| 230 | XOUT(I)<=XSQ(I) |
| 235 | end loop |
| 240 | endif |
| 245 | end BIT_REC_SQR |

The program listing of Table 9 begins by defining the entity "M_BIT_SQUARER" to have I/O ports with M bits of input called XIN indexed 0 to M−1, and 2M bits of output called XOUT indexed 0 to 2M−1 (lines 5–25). The value of "M" is declared to be generic, which means that it is an integer to be supplied later, when a specific "instantiation"

of the circuit is invoked by a user of the circuit, for example, by a higher level block incorporating it as a component for a particular value of M.

The VHDL code then continues to describe one possible architecture for an M-bit squarer beginning at line 30. The particular architecture described is the bitwise recursive squarer shown in FIG. 3, so this architecture for "M_BIT_SQUARER" is called "BIT_REC_SQR." VHDL allows multiple architectures to be defined for the same logical function, so "M_BIT_SQUARER" could have other, possibly non-recursively defined architectures to realize the circuit. In such case, the user has a choice which configuration to employ in a particular case. Recursively-designed circuits, such as that shown in FIGS. 3 and 5, will be more efficient in many circumstances.

The architecture definition of the M-bit squarer comprises the explicit definition of a 2-bit squarer shown in FIG. 4 when it is detected that the value of the generic integer parameter M equals 2. This explicit definition is contained in lines 45–105 of Table 9. The 2-bit squarer employs two component types—an inverter and a 2-input NAND gate. The definition of the 2-bit squarer uses one component of type INVERTER connected to two components of type NAND2. The interconnections are specified by which signal names appear in the respective input and output signal lists (argument lists) each time a component is called up.

If M is greater than 2, then the architecture definition proceeds at line 115 to define the M-bit squarer in terms of three interconnected blocks denoted BLOCK1, BLOCK2, and BLOCK3. BLOCK1 is a block called "ENABLED_ADDER" of length M−2 bits, which is defined in lines 115–150. BLOCK2 is a block called "ENABLED_HALF_NADDER", which logically is a half-adder with inverted sum output. BLOCK2 is defined in lines 155–165. BLOCK3 is a recursive instantiation of the M-bit adder itself for the generic value of M−1, which is defined in lines 170–190.

If current VHDL compilers could accept such recursive calls, the entire definition of "M_BIT_SQUARER" architecture "BIT_REC_SQR" would be entered from the beginning with M successively reduced by one at each recursion until the value M=2 was detected by the "if" statement in line 40. The 2-bit squarer definition would then be substituted and the recursion would reverse, adding the remaining blocks to successively complete a 3-bit squarer, then a 4-bit squarer, and so forth up to the desired value of M.

The use of the signal statement in line 195 allows internal logic signals that are neither input nor output to be defined. Signal XSQ is used to label the output bits from the M−1 bit squarer. The subsequent FOR loop at line 225 connects M bits of the output bits from the M−1 bit squarer to the output bits XOUT. The other M−2 bits from the output of the M−1 bit squarer are connected internally to the M−2 bit adder. The use of "signals" labeled XSQ when a device calls itself recursively is another potential violation of current VHDL compilers, which cannot distinguish the signals labeled XSQ in the first recursion from signals labeled XSQ in the subsequent recursions. This problem can be fixed in later versions of VHDL compilers for handling recursion by considering "signals" to be created on a work space stack, analogous with the use of stacks in the above-described FORTRAN code.

The bitwise recursive squaring circuit of FIG. 3 could, alternatively, be defined by non-recursive VHDL code. Instead of starting with an M-bit squarer and working backward, a VHDL definition could start with a 2-bit squarer and work upward using a "for" loop. Each "for" loop could successively add the additional circuitry to make a 3-bit squarer, a 4-bit squarer, and so forth. However, replacing a backwards recursion from M down to 2 with a forward loop starting at 2 and incrementing upward to M is only possible when the recursive definition of a circuit invokes only one instance of itself. When the recursive definition of a circuit invokes more than two instances of itself, e.g., three instances needed by the K-O Multiplication Algorithm, then recursion cannot be described by a simple forward iteration.

As previously indicated, current VHDL compilers do not support recursive definitions. Therefore, one implementation of the inventive design method described herein is to provide a pre-processor for processing recursive VHDL code as exemplified in Table 9 in order to replace it for a specific value of M, with expanded VHDL code containing explicit definitions of each instantiation of a recursively-used circuit block. The pre-processor can also resolve the problem of signal name confusion by automatically generating distinct signal names, such as XSQ1, XSQ2, XSQ3 . . . and CARRY1, CARRY2, CARRY3 . . . etc. for each successive instantiation of the recursively-used block needing its own, separate internal signals.

The output VHDL code would be compatible with existing, non-recursive VHDL compilers, so could be incorporated in a VHDL circuit design needing a squarer or multiplier or other recursively-designed circuit for a specific value of a generic parameter, such as M in the above example. Thus, the circuit design would, until recursive compilers are available, comprise the following steps:

1. Execute the pre-processor to process recursive VHDL code for each recursively-defined circuit block, for the specific values of the generic parameter used in each instantiation, producing standard VHDL code files for each instance of each circuit block;
2. Incorporate the standard VHDL code files output from the pre-processor into the standard VHDL definition of the overall circuit as "components"; and
3. Compile the standard VHDL code incorporating the pre-processor output files using a standard VHDL compiler.

As an example of the output code of such a pre-processor, Table 10 shows the definition of a 4-bit squarer generated from the recursive definition of an M-bit squarer.

TABLE 10

OUTPUT OF PRE-PROCESSOR

| LINE # | INSTRUCTION |
|---|---|
| 05 | entity FOUR_BIT_SQUARER is |
| 10 | port(XIN:in BIT_VECTOR(0 to 3); |
| 15 | XOUT:out BIT_VECTOR(0 to 7)); |
| 20 | end FOUR_BIT_SQUARER; |
| 25 | architecture BIT_REC_SQR_FOUR of FOUR_BIT_SQUARER is |
| 30 | component ENABLED_ADDER |

TABLE 10-continued

OUTPUT OF PRE-PROCESSOR

| LINE # | INSTRUCTION |
|---|---|
| 35 | generic(N:INTEGER); |
| 40 | port(A:in BIT_VECTOR(0 to N−1); |
| 45 | B:in BIT_VECTOR(0 to N−1); |
| 50 | ENABLE:in BIT; |
| 55 | C:out BIT_VECTOR(0 to N−1); |
| 60 | CARRY:out BIT |
| 65 | end component |
| 70 | component ENABLED_HALF_NADDER |
| 75 | port(BM1,BM2,CF:in BIT;XM1,XM2:out BIT); |
| 80 | end component |
| 85 | component THREE_BIT_SQUARER |
| 90 | port(X:in BIT_VECTOR(0 to 2); |
| 95 | XSQ:out BIT_VECTOR(0 to 5); |
| 100 | end component |
| 105 | signal XSQ:BIT_VECTOR(0 to 5);CARRY:BIT |
| 110 | begin |
| 115 | BLOCK1:ENABLED_ADDER generic map(2) port map(XSQ(4),XIN,XOUT(4)) |
| 120 | BLOCK2:ENABLED_HALF_NADDER |
| 125 | port map(XIN(3),XIN(2),CARRY,XOUT(6),XOUT(7)); |
| 130 | BLOCK3:THREE_BIT_SQUARER port map(XIN,XSQ) |
| 135 | for I in 0 to 3 loop |
| 140 | XOUT(I)<=XSQ(I) |
| 145 | end loop |
| 150 | endif |
| 155 | end BIT_REC_SQR_FOUR |
| 160 | entity THREE_BIT_SQUARER is |
| 165 | port(XIN:in BIT_VECTOR(0 to 2); |
| 170 | XOUT:out BIT_VECTOR(0 to 5)); |
| 175 | end THREE_BIT_SQUARER; |
| 180 | architecture BIT_REC_SQR_THREE of THREE_BIT_SQUARER is |
| 185 | component ENABLED_ADDER |
| 190 | generic(N:INTEGER); |
| 195 | port(A:in BIT_VECTOR(0 to N−1); |
| 200 | B:in BIT_VECTOR(0 to N−1); |
| 205 | ENABLE:in BIT; |
| 210 | C:out BIT_VECTOR(0 to N−1); |
| 215 | CARRY:out BIT |
| 220 | end component |
| 225 | component ENABLED_HALF_NADDER |
| 230 | port(BM1,BM2,CF:in BIT;XM1,XM2:out BIT); |
| 235 | end component |
| 240 | component TWO_BIT_SQUARER |
| 245 | port(X:in BIT_VECTOR(0 to 1); |
| 250 | XSQ:out BIT_VECTOR(0 to 3); |
| 255 | end component |
| 260 | signal XSQ:BIT_VECTOR(0 to 3);CARRY:BIT |
| 265 | begin |
| 270 | BLOCK1:ENABLED_ADDER generic map(1) port map(XSQ(3),XIN,XOUT(3)) |
| 275 | BLOCK2:ENABLED_HALF_NADDER |
| 280 | port map(XIN(2),XIN(1),CARRY,XOUT(4),XOUT(5)); |
| 285 | BLOCK3:TWO_BIT_SQUARER port map(XIN,XSQ) |
| 290 | for I in 0 to 2 loop |
| 295 | XOUT(I)<=XSQ(I) |
| 300 | end loop |
| 305 | endif |
| 310 | end BIT_REC_SQR_FOUR |
| 315 | entity TWO_BIT_SQUARER is |
| 320 | port(XIN:in BIT_VECTOR(0 to 1); |
| 325 | XOUT:out BIT_VECTOR(0 to 3)); |
| 330 | end TWO_BIT_SQUARER; |
| 335 | architecture BIT_REC_SQR_TWO of TWO_BIT_SQUARER is |
| 340 | component INVERTOR |
| 345 | port(Z:in BIT; ZBAR:out BIT); |
| 350 | end component |
| 355 | component NAND2 |
| 360 | port(A1,A2:in BIT; A1A2:out BIT); |
| 365 | end component |
| 370 | signal ZBAR:BIT |
| 375 | begin |
| 380 | GATE1:INVERTOR port map(XIN(0),ZBAR) |
| 385 | GATE2:NAND2 port map(XIN(1),XIN(0),XOUT(2)) |
| 390 | GATE3:NAND2 port map(XIN(1),ZBAR,XOUT(3)) |
| 395 | XOUT(1)<="0" |
| 400 | XOUT(0)<=XIN(0) |
| 405 | end BIT_REC_SQR_TWO |

Table 10 shows that the name "M_BIT_SQUARER" has been replaced with a specific instance of the name for M=4, and that the main block is now entitled "FOUR_BIT_SQUARER". Likewise, throughout the code, the generic value of M has been replaced by a specific value of M, namely M=4. Also, where the recursive code previously called up the block "M_BIT_SQUARER" itself, as a component, for which M is later set equal to 3, the non-recursive code of Table 10 calls up a specific instance of an M_BIT_SQUARER with M set to 3, and the name of the block is accordingly denoted as "THREE-BIT_SQUARER". The latter is then defined as an entity in the next block of code. It, in turn, calls up a "TWO_BIT_SQUARER" as a component, for which there is then a specific design available, completing the definition. Thus, a pre-processor can be defined that translates recursive VHDL that cannot be compiled by conventional VHDL compilers into non-recursive code that can be used to enable logic circuit designers to avail themselves of the advantages of recursive VHDL in advance of recursive VHDL compilers.

Those skilled in the art will recognize that the use of recursive VHDL as described above can be used for many different types of logic circuits. For example, the N-bit adder used in the above example can be defined recursively as an N−1 bit adder, plus an extra adder stage to extend it from N−1 to N-bits. This is an example which, however, can be performed alternatively using a "for" loop.

Not all circuits with a recurrent structure can be easily defined recursively. For example, U.S. Pat. No. 5,978,826 to Kolatgola and Kumar describes an N-bit adder formed by cascading adder cells of alternatively "even" and "odd" type. The "even" type adders output the inverse of the normal carry bit while the "odd" type adders accept the inverse carry bit and provide a non-inverted carry bit, thereby saving the equivalent of one gate input (or one inverter, or two transistors) per adder cell. A useful N-bit adder, however, has non-inverted carry outputs, and so its VHDL code cannot merely call itself if inverted and non-inverted outputs alternate between successive stages. Instead, the N-bit adder can be defined as a non-recursive VHDL block comprising an "even" type adder cell cascaded with a recursive VHDL block describing an (N−1) bit adder ending with an "odd" type cell. This block, in turn, describes an "odd" cell cascaded with a 1-bit shorter adder ending in an "even" cell, and the adder ending in the even cell recursively calls the adder ending in the "odd" cell. In this example, the recursion may not be apparent to a standard VHDL compiler as no routine calls itself, but incorrect results are likely to occur unless a true recursive VHDL compiler, or a recursive VHDL pre-processor is used according to the present invention. The Kolatgola-Kumar adder may alternatively be defined as a 2N-bit adder comprising an odd/even cell pair cascaded with a (2N−2)-bit adder.

What is claimed is:

1. A squaring circuit comprising:
   a host processor to compute the square of a long integer value by recursively reducing the square of said long integer value to a combination of the squares of reduced length integer values of a predetermined length, wherein at each step of said recursion said host processor reduces starting integer values to a combination of squares of three ending integer values of one-half the length of said starting integer values;
   a co-processor connected to said host processor to compute the squares of said reduced length integer values by further recursively reducing the squares of said reduced integer values into a combination of squares of hardware-length integer values that can be squared by hardware logic circuits, wherein at each step of said recursion said co-processor reduces starting integer values to a combination of squares of three ending integer values of one-half the length of said starting integer values; and
   one or more hardware logic circuits to square said hardware-length integer values.

2. The squaring circuit of claim 1 wherein said one or more hardware logic circuits comprise a separate hardware logic circuit for each hardware-length integer value to be squared.

3. The squaring circuit of claim 1 wherein said host processor further computes the product of two long integer values by computing the difference between the square of the sum of said two long integer values and the square of the difference of said two long integer values.

4. The squaring of claim 3 wherein said host processor divides said sum of said two long integer values and said difference of said two long integer values by two before computing said squares of said sum and said difference.

5. The squaring circuit of claim 4 wherein said host processor adds the smaller value of said two long integer values to the difference of said squares to form said final product.

6. The squaring circuit of claim 1 wherein said host processor further computes a power of a long integer value by computing successive squares of said long integer value and by computing the product of selected ones of said successive squares corresponding to binary "1"s in said power.

7. The squaring circuit of claim 6 wherein said host processor computes said product of selected ones of said successive squares by computing the difference between the squares of the sum and the difference of said successive squares.

8. The squaring circuit of claim 1 further comprising randomly ordering each set of three ending integer values in at least one stage of said recursion.

9. A method of squaring a long integer value comprising:
   recursively reducing the square of said long integer value in a host processor to a combination of squares of reduced integer values, wherein at each step of said recursion said host processor reduces starting integer values to a combination of squares of three ending integer values of one-half the length of said starting integer values;
   computing the squares of said reduced-length integer values in a co-processor connected to said host processor by further recursively reducing the squares of said reduced integer values into a combination of squares of hardware-length integer values that can be squared by hardware logic circuits, wherein at each step of said recursion said co-processor reduces starting integer values to a combination of squares of three ending integer values of one-half the length of said starting integer value; and
   computing the squares of said hardware-length integer values in one or more hardware logic circuits.

10. The method of claim 9 wherein computing said square of said hardware length integer values comprises computing said squares of said hardware-length values in separate hardware logic circuits.

11. The method of claim 9 further comprising computing the product of two long integer values in said host processor by computing the difference between the squares of the sum and the difference of said two long integer values.

12. The method of claim 11 wherein computing the difference between said squares of said sum and said difference of said two long integer values comprises dividing said sum and said difference of said two long integer values by two before computing said squares of said sum and said difference.

13. The method of claim 12 wherein computing said difference between said squares of said sum and said difference of said two long integer values further comprises adding the smaller of said two long integer values to said difference of said squares of said sum and said difference to form said final product.

14. The method of claim 9 further comprising computing a power of said long integer value by computing successive squares of said long integer value and by computing the product of selected ones of said successive squares corresponding to binary "1"s in said power.

15. The method of claim 14 wherein computing the product of selected ones of said successive squares corresponding to binary "1"s in said power comprises computing the difference between the squares of the sum and the difference of said successive squares.

16. The method of claim 9 further comprising randomly ordering each set of three ending integer values in at least one stage of said recursion.

17. A squaring circuit comprising:
a host processor to compute the square of a long integer value by recursively reducing said square of said long integer value into a combination of squares of reduced integer values, wherein at each step of said recursion said host processor reduces starting integer values to a combination of squares of three ending integer values of one-half the length of said starting integer values, and wherein at each step of said recursion said host processor randomly orders said ending integer values; and
a co-processor connected to said host processor to compute the squares of said reduced-length integer values.

18. The method of claim 17 further comprises one or more hardware logic circuits to square hardware-length integer values and wherein said co-processor computes the squares of said reduced-length integer values by further recursively reducing the squares of said reduced length integer values into a combination of squares of hardware length integer values whose values are computed by said hardware logic circuits.

19. The squaring circuit of claim 17 further comprising a noise generator to generate a random sequence used for randomly ordering said ending integer values by combining squares of further-reduced-length integer values performed by a hardware logic circuit.

20. The squaring circuit of claim 18 wherein said one or more hardware logic circuits comprise a separate hardware logic circuit for each further-reduced-length integer value to be squared.

21. The squaring circuit of claim 17 wherein said host processor further computes the product of two long integer values by computing the difference between the squares of the sum and the difference of said two long integer values.

22. The squaring of claim 21 wherein said host processor divides said sum and said difference by two before computing the squares of said sum and said difference.

23. The squaring circuit of claim 22 wherein said host processor adds the smaller value of said two long integer values to the difference of said squares to form said final product.

24. The squaring circuit of claim 17 wherein said host processor further computes a power of a long integer value by computing successive squares of said long integer value and by computing the product of selected ones of said successive squares corresponding to binary "1"s in said power.

25. The squaring circuit of claim 24 wherein said host processor computes said product of selected ones of said successive squares by computing the difference between the squares of the sum and the difference of said successive squares.

26. The squaring circuit of claim 17 further comprising randomly ordering each set of three ending integer values in at least one stage of said recursion.

27. A circuit for multiplying two long integer values including secret data while hiding the value of the secret data, said circuit comprising:
a host processor to compute the product of said two long integer values by recursively reducing a product of said two long integer values to a combination of products of reduced length integer values of a predetermined length, wherein at each step of said recursion said host processor expresses starting integer values as a combination of products of three ending integer values of one-half the length of said starting integer values, and wherein at each step of said recursion said host processor randomly orders said ending integer values; and
a co-processor connected to said host processor to compute products of said reduced-length integer values.

28. The circuit of claim 27 further comprising a noise generator to generate a random sequence used to randomly order said ending integer values.

29. A method of squaring a secret long integer value using an insecure co-processor connected to a secure host processor, said method comprising:
recursively reducing a square of said long integer value to a combination of squares of reduced-length integer values of a predetermined length in said secure host processor, wherein at each step of said recursion said secure host processor reduces starting integer values to a combination of squares of three ending integer values of one-half the length of said starting integer values;
randomly ordering said three ending integer values at each stage of said recursion; and
computing squares of said reduced-length integer values in said insecure processor and returning the result to said host processor to compute the final square of said long integer value.

30. The method of claim 29 where randomly ordering said ending integer values at each stage of said recursion comprises generating a random sequence in a noise generator to control ordering of said ending integer values.

31. A method of multiplying two long integer values including secret data while hiding the value of said secret data, said method comprising:
computing the product of said two long integer values in a secure host processor by recursively reducing the product of said long integer values to a combination of products of reduced-length integer values, wherein at each step of said recursion said host processor expresses the product of starting integer values as a combination of the products of three ending integer values of one-half the length of said starting integer values;

at each stage of said recursion, randomly ordering said three ending integer values; and computing the product of each set of final ending integer values output from said host processor and returning said products to said host processor to use in computing the final product of said two long integer values.

32. The method of claim 31 wherein randomly ordering said ending integer values comprises generating a random sequence in a noise generator to control ordering of said ending integer values.

33. A method of designing a logic circuit to be manufactured comprising:
defining an indexing parameter;
for values of said indexing parameter extending from a desired value to a minimum value, defining a recursive logic circuit with said indexing parameter set to a current value as interconnections between pre-defined logic circuits and one or more instances of said recursive logic circuit with said indexing parameter less than said current value;
defining a base logic circuit with an indexing parameter equal to said minimum value as interconnections between pre-defined logic circuits; and
processing said definitions of said recursive logic circuits and said base logic circuit for said desired value of said indexing parameter to produce a definition of said recursive logic circuit for said desired value of said indexing parameter in terms of said pre-defined logic circuits.

34. The method of claim 33 wherein defining an indexing parameter comprises defining said indexing parameter as the wordlength of a data value processed by said logic circuit.

35. The method of claim 33 wherein defining a recursive logic circuit with said indexing parameter set to a current value as interconnections between predefined logic circuits and one or more instances of said logic circuit with said indexing parameter less than said current value comprises defining a recursive logic circuit as interconnections between predefined logic circuits and one ore more instances of said recursive logic circuit with said indexing parameter equal to said current value less one.

36. The method of claim 33 wherein defining a recursive logic circuit with said indexing parameter set to a current value as interconnections between predefined logic circuits and one ore more instances of said recursive logic circuit with said indexing parameter less than said current value comprises defining said recursive logic circuit as interconnections between predefined logic circuits and an instance of said logic circuit with said indexing parameter equal to half said current value.

37. The method of claim 33 wherein defining a recursive logic circuit with said indexing parameter set to a current value as interconnections between predefined logic circuits and one ore more instances of said recursive logic circuit with said indexing parameter less than said current value comprises describing said recursive logic circuit using VHDL.

38. The method of claim 37 wherein processing said definitions of said recursive logic circuits and said base logic circuit for said desired value of said indexing parameter to produce a definition of said recursive logic circuit for said desired value of said indexing in terms of said predefined logic circuits comprises processing said definitions using a recursive VHDL compiler.

39. The method of claim 37 wherein processing said definitions using a recursive VHDL compiler comprises:
preprocessing recursive VHDL definitions to produce a modified, non-recursive VHDL description of said final logic circuit; and
processing said non-recursive VHDL definition of said final logic circuit using a non-recursive VHDL compiler to produce a definition of said final logic circuit in terms of interconnections between said predefined logic circuits.

40. The method of claim 33 in which said final logic circuit is a circuit for multiplying long integers.

41. The method of claim 33 in which said logic circuit is a circuit for squaring long integers.

42. The method of claim 33 wherein defining a base logic circuit with said indexing parameter equal to said minimum value as interconnections between predefined logic circuits comprises defining a base logic circuit with an indexing parameter equal to two.

* * * * *